United States Patent [19]
Edmonds et al.

[11] Patent Number: 5,443,682
[45] Date of Patent: Aug. 22, 1995

[54] SECURING OBJECTS SUCH AS SCALLOPS TO A BACKING MATERIAL

[75] Inventors: Timothy K. Edmonds, Halifax; James D. MacAulay, Dartmouth, both of Canada

[73] Assignee: Fisheries Resource Development (1988) Limited, Dartmouth, Canada

[21] Appl. No.: 79,996

[22] Filed: Jun. 18, 1993

[51] Int. Cl.⁶ .............................................. B32B 31/04
[52] U.S. Cl. ..................................... 156/552; 156/522; 156/548; 156/551; 119/204; 119/238; 198/470.1; 198/476.1
[58] Field of Search ............... 156/522, 552, 547, 548, 156/551; 119/204, 215, 238; 198/470.1, 476.1, 493, 496, 731

[56] References Cited

U.S. PATENT DOCUMENTS

| | | |
|---|---|---|
| 385,161 | 6/1888 | Beach . |
| 1,169,351 | 1/1916 | Quay ..................... 198/731 |
| 1,815,521 | 7/1931 | Miyagi . |
| 3,638,615 | 2/1972 | Budge et al. ............. 119/4 |
| 3,656,458 | 4/1972 | Marcus et al. ............. 119/4 |
| 3,779,209 | 12/1973 | Budge et al. ............. 119/4 |
| 3,811,411 | 5/1974 | Moeller ................... 119/4 |
| 4,177,759 | 12/1979 | Maheo ..................... 119/4 |
| 4,270,488 | 6/1981 | Kennedy ................... 119/4 |
| 4,278,488 | 7/1981 | Kopacz et al. .......... 156/552 X |
| 4,287,980 | 9/1981 | Montferme .............. 198/470.1 X |
| 4,441,611 | 4/1984 | Sommariva ................ 206/431 |
| 4,549,729 | 10/1985 | Hoffstetter et al. ........ 156/552 X |
| 4,854,774 | 8/1989 | Streichenberger ........... 405/25 |
| 4,872,782 | 10/1989 | Streichenberger ........... 405/24 |
| 4,913,094 | 4/1990 | Jones et al. .............. 119/3 |
| 4,936,440 | 6/1990 | Focke et al. ............. 198/470.1 X |
| 4,950,104 | 8/1990 | Streichenberger ........... 405/24 |
| 4,983,644 | 1/1991 | Mukai et al. .............. 522/14 |

FOREIGN PATENT DOCUMENTS

| | | |
|---|---|---|
| 551074 | 2/1984 | Australia . |
| 55-165735 | 12/1980 | Japan . |
| 61-31033 | 7/1984 | Japan . |
| 2-186926 | 7/1990 | Japan . |
| 1482911 | 8/1977 | United Kingdom . |
| 2061081 | 5/1981 | United Kingdom . |
| 2136760 | 9/1984 | United Kingdom ........ B65D 73/00 |

*Primary Examiner*—David A. Simmons
*Assistant Examiner*—Paul M. Rivard
*Attorney, Agent, or Firm*—John W. Ross

[57] ABSTRACT

Selected objects such as scallops, are automatically secured in spaced apart bottom-to-bottom relation to elongated strips for subsequent suspension in sea water for a final grow-out period. Linear arrays of these objects, to which adhesive has been applied, are brought into bottom-to-bottom contact with the strip and held there until bonds have formed, following which the strip with attached objects is released from the machine and the procedure is thereafter automatically repeated.

34 Claims, 16 Drawing Sheets

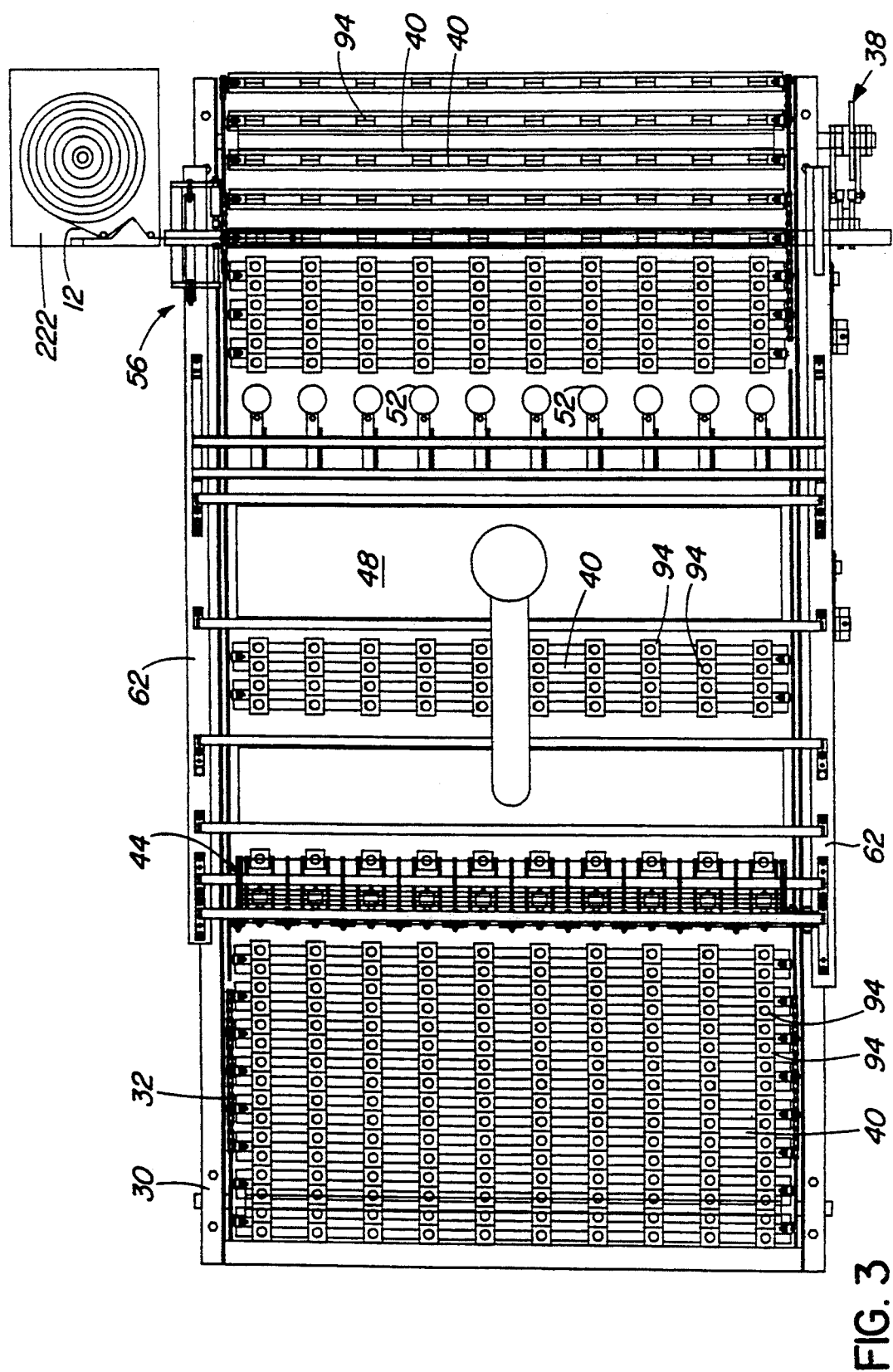

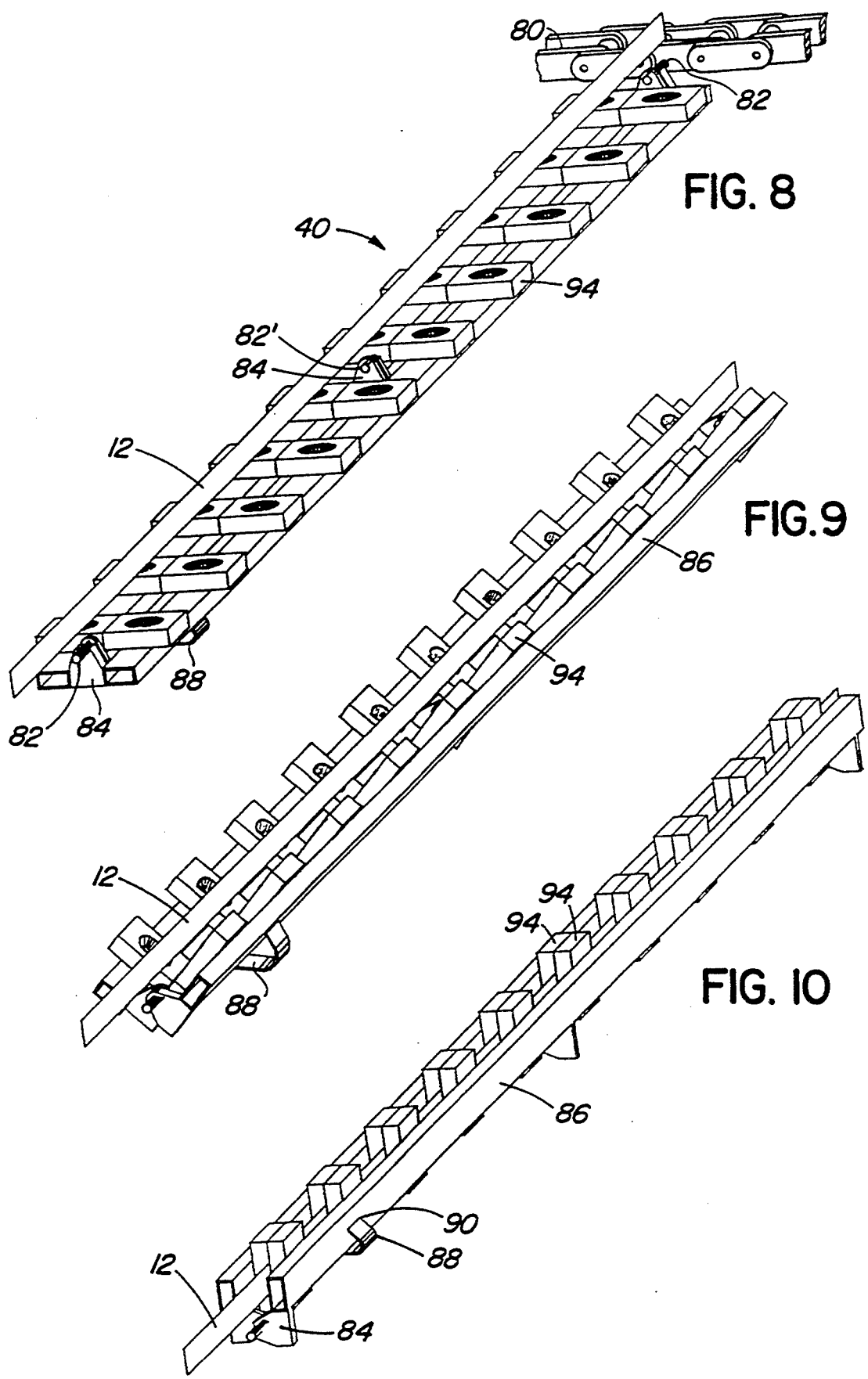

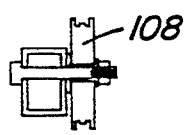
FIG. 12
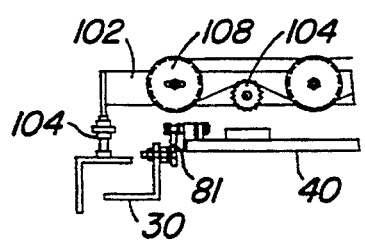
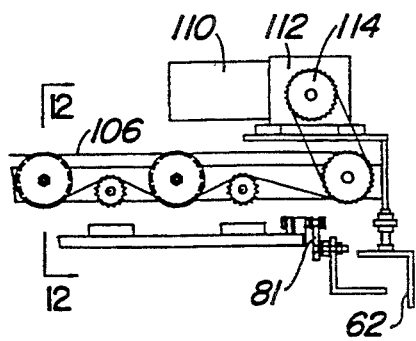
FIG. 11
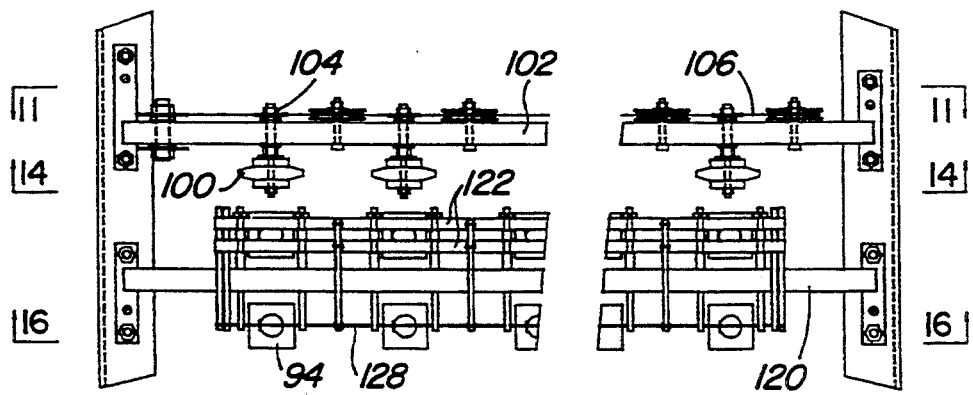
FIG. 13
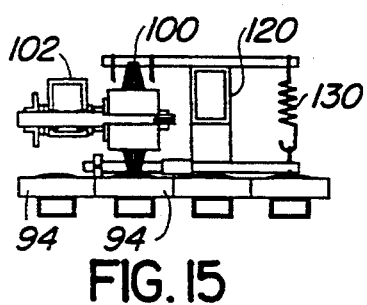
FIG. 15
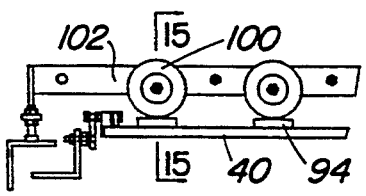
FIG. 14
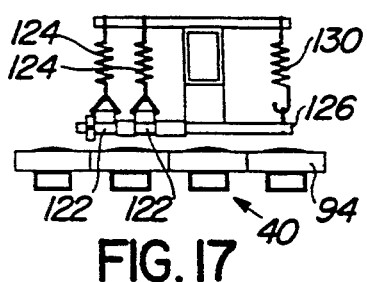
FIG. 17
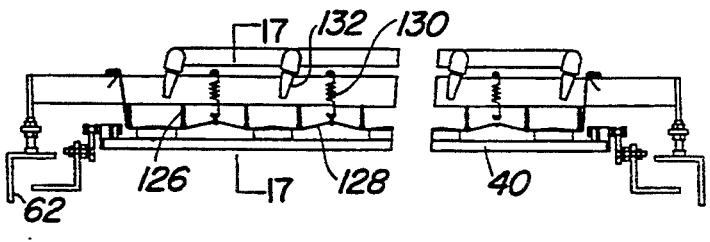
FIG. 16

SECURING OBJECTS SUCH AS SCALLOPS TO A BACKING MATERIAL

BACKGROUND OF THE INVENTION

This invention relates generally to an apparatus and method for securing objects, particularly scallops, to a suitable backing material preferably an elongated strip.

The present invention is particularly related to scallop aquaculture. Scallop aquaculture is currently being carried out in several countries around the world. Scallops raised by aquaculture techniques generally profess through three distinct life phases namely, a free-swimming larval stage, an intermediate nursery and juvenile phase, and the final adult grow-out stage. The free-swimming larval stage terminates approximately one months after hatching when the scallops then settle on a solid matrix and begin the transformation into the juvenile stage, ultimately progressing into a more sedentary adulthood.

Scallop aquaculture can be effected by rearing the animals in a hatchery or by capture of wild seed. The animals may be held in cages until they are of sufficient size for release to a bottom habitat or alternatively suspended by a technique called ear-hanging during the grow-out stage.

Bottom culture of adult animals is no different from what occurs in the wild and requires many square kilometres of suitable bottom habitat. Because of security considerations and competitive factors this approach to scallop aquaculture is not feasible in many parts of the world including North America.

Ear-hanging has been practised for a number of years and is accomplished by drilling a small hole in the base of the shell from which the scallop is fastened to a buoyed line. Cage grow-out and ear-hanging are labour intensive and have generally proven to be uneconomic in areas where labour costs are high such as in North America.

The advantages of suspending juvenile scallops for the final grow-out period in seawater has been recognized for some time. Several years ago a number of Spaniards began harvesting under-sized animals from the wild which they then cemented to ropes. The ropes with cemented scallops were suspended in the seawater for further growth and the animals were harvested when prices were suitably high. The technique used was relatively simple: the fiat bottom of one scallop was cemented to the more concave top of another scallop with a rope of undefined diameter between. The cement used required approximately two hours to set. The process of adhering the scallops to the ropes apparently involved a tedious and time consuming manual technique.

In the cases reported relating to suspended cultures of shellfish, enhanced growth rates were observed coupled with lower mortality rates. The suspended shellfish received better nutrition and were much less subject to attack by parasites and other disease-causing organisms.

Japanese Published Patent Application No. 165,735 published Dec. 24, 1980 of Hisaya Yamazaki et al and assigned to Takeda Chemical Industries et al discloses a technique for cultivating shell fish in water, the shell fish being adhered to a frame by a hydro-setting type liquid urethane resin. The material for the frame includes plastics, organic and inorganic fibres and other materials. The urethane resin is applied manually either to the frame or to the surface of the shell fish (preferably scallops). The frame with the adhered scallops is then placed in water for the final grow-out period.

Japanese Published Patent Application No. 186,926 published Jul. 23, 1990 invented by Yoshiaki Takeuchi et al and assigned in part to Daiabond Industries, Ltd. also discloses a technique for culturing pearls wherein the pearl oysters are adhered to a suspension belt which is suspended in the sea for the desired grow-out period. The patent notes a number of adhesives capable of reacting with moisture in the air so as to rapidly harden and adhere which may be chosen including cyanoacrylate adhesives, two-solution type or one-solution type urethane adhesives, epoxy adhesives, radical polymerization adhesives or hot-melt adhesives. In carrying out the technique, the adhesion points on the oyster shells are cleaned and adhesive is manually applied to the adhesion points following which the oysters are adhered to the suspension belt.

The above-noted prior art points out the need to provide means for quickly and accurately securing shellfish to a suitable backing for suspension in sea water thereby to avoid the time-consuming and costly manual techniques previously noted.

SUMMARY OF THE INVENTION

It is a basic object of the present invention to provide methods and apparatus for automatically securing objects such as shellfish to elongated strips of material which are subsequently suspended in seawater in order that the shellfish while suspended may grow out to a desired size.

In accordance with the invention in one aspect there is provided a method for securing objects to an elongated strip of material comprising: a) advancing said strip to a position adjacent to a linearly arranged group of spaced apart said objects to which adhesive has been applied; b) bringing said spaced apart objects into contact with said strip so that the adhesive is located between the objects and the strip; c) maintaining said contact until the adhesive has formed a bond capable of securing the objects in their spaced apart relation along and to the strip, and d) repeating steps (a) to (c) with successive said strips of material and successive groups of said objects.

Further in accordance with the method aspect of the invention in step (b), said objects are brought into contact with opposing faces of the strip in coincidence with one another so as to form spaced apart pairs on said strip.

In a preferred form of the invention said strip is an open weave fabric to allow penetration of the adhesive therethrough to enhance the bond between the strip and the objects.

The method could be used for the attachment of a variety of objects to an elongated strip of material although in a preferred form of the invention the objects to be attached are bi-valve molluscs, especially scallops.

In accordance with further aspect of the invention there is provided an apparatus for securing objects to elongated strips of material and comprising: a) means for holding a linear array of spaced apart said objects; b) means for applying adhesive to a surface of each said object; c) means for advancing said holding means to a selected position; d) means for disposing a length of said strip of material adjacent said linear array of objects when at said selected position; e) means for moving said holding means relative to said strip thereby to bring said array of objects into contact with said strip and to maintain the contact such that the adhesive is able to create a bond between the strip and the array of objects.

Further in accordance with the apparatus aspect of the invention, said holding means is capable of holding two linear arrays of said spaced objects in a first position on opposing sides of said strip of material and, when moved by said means for moving said holding means (e) to a second position, of bringing said arrays of objects into contact with opposing faces of the strip in coincidence with one another so as to provide for securement of spaced apart pairs of the objects on the strip.

In accordance with a preferred form of the invention there is provided an apparatus for securing objects to elongated strips of material. The apparatus includes a conveyor movable step-by-step in an endless path of travel and having spaced pairs of elongated conveyor flights each having seats for holding a linear array of the objects and said flights extending transversely to said path of travel. The flights of each of said pairs are pivotable relative to one another from an open position for loading of the objects on said seats to a closed position wherein the seats of one said flight are brought into face-to-face correspondence with the seats of the opposing flight. Conveyor flight closure means are located at a closure station in the path of movement of the conveyor to effect movement of said flights from the open to the closed position after each pair of flights arrives at said closure station in the course of said step-by-step movement of the conveyor. Material strip positioning means are located at the closure station for positioning a strip of said material between the flights of the respective pairs when in the open position and holding the strip such that the seats of said flights come into said face-to-face relation on opposing sides of said strip to bring objects in said seats into contact with opposing sides of said strip. An adhesive applicator is provided to apply adhesive to the said objects in such manner that the applied adhesive can interact between the strip and said objects after said objects have been brought into contact with the strip. A conveyor flight opening means is located at a release station to open said flights and release said objects and the strip to which they have become bonded by said adhesive after each pair of flights arrives at said release station in the course of said step-by-step motion of the conveyor.

According to a preferred form of the apparatus said flights of said pair are pivoted relative to each other about an offset axis. Spring means co-acting between the flights of said pair are arranged along with the degree of offset of said axis to provide an over-center bi-stable effect providing stable open and closed positions for said flights of each pair.

The conveyor fight closure means preferably includes arms movable into engagement with the conveyor flights in the open position and acting to force same toward the closed position with said spring means acting to complete the movement of the conveyor flights into the closed position.

The said strip positioning means preferably comprises a device for grasping the strip and pulling it lengthwise of the open flights and maintaining the strip under tension until closure of said flights is effected.

The strip positioning means also includes a shear for cutting the strip after closure of the flights is effected.

The device for grasping the strip preferably comprises a pair of fingers capable of grasping the strip between their distal ends, a car on which said fingers are mounted and a track means at said closure station above said conveyor so that the car may travel lengthwise of the conveyor flights in the course of pulling the strip of material. Means for effecting movement of the car along said track in timed relationship to the step-by-step motion of said conveyor are provided. The fingers of said pair are preferably pivoted at their proximal ends and are associated with biasing means providing an over-centre bi-stable snap action effect providing both stable open and closed positions for said fingers. Means are provided for initiating snap action opening and closure of said fingers adjacent opposing ends of the path of travel of said car along said track means.

The above-noted objects are preferably juvenile scallops and the said seats for holding said objects preferably comprise soft resilient pads each having a concave recess for nesting of a scallop therein.

A suitable adhesive applicator is adapted to apply a small quantity of adhesive to an upper surface of each object (scallop) prior to their reaching the closure station.

The apparatus includes means in advance of said flight closure means for washing a surface of each scallop and means for drying the scallop shells prior to their coming into contact with the adhesive.

The means for washing preferably comprises rotary brushes arranged above said conveyor to come into contact with upper surface portions of said scallops and means for supplying water to said brushes. Resilient means for retaining said scallops on said resilient pads during washing with said rotary brushes are provided.

The drying means preferably includes a blower for passing warm air into a plenum chamber above said conveyor, said chamber having apertures therein for releasing streams of air onto scallops supported on said conveyor for drying game.

The washing and drying means, adhesive applicators and strip positioning device are all mounted to a vertically movable carriage. Means are provided for vertically moving said carriage in timed relation to the motion of said conveyor to provide clearance and avoid interference between scallops supported on said conveyor and the washing and drying means as said conveyor effects movement of said scallops.

The conveyor preferably includes upper and lower horizontal runs, said flight closure means, material strip positioning means and adhesive applicator being located adjacent to said upper run of the conveyor and said flight opening means being adapted to interact with the lower run of said conveyor.

The conveyor includes suitable means for driving same in step-by-step fashion, said means for driving preferably including an advance spring operatively connected to the conveyor and means for periodically stretching said spring with the stored energy being used to drive said conveyor.

The flight opening means preferably comprises a plurality of opener fingers and means for effecting movement thereof toward and away from the lower run of the conveyor. The opener fingers have wedge-shaped tips adapted to enter between the closed flights of each pair upon their arrival at the release station and to wedge the flights of each pair toward the open position, with said flights moving into the open position under the influence of said spring means which co-acts between the flights of each pair.

The tips of the opener fingers are slotted to receive therein the strip of material to which the objects have become bonded upon release of the latter as said flights move to the open position. A slotted comb is provided through which said opener fingers can move, with said comb acting to positively remove the strip of material and attached objects from the slotted tips of said opener fingers as the latter move away from the conveyor flights.

Further features of the invention will become readily apparent from the following description and claims as well as the appended drawings.

BRIEF DESCRIPTION OF THE VIEW OF DRAWINGS

In drawings which illustrate a preferred embodiment of the invention:

FIG. 1 diagrammatically illustrates a system for holding scallops in suspended culture in sea water;

FIG. 3 and 4 are top plan and side elevation views respectively of the complete apparatus for securing the objects (e.g. scallops) to the elongated strips of material;

FIGS. 8, 9 and 10 are perspective views illustrating a complimentary pair of conveyor flights in the full open, half-closed and fully closed positions respectively, each conveyor flight including spaced resilient cups for holding the objects (scallops);

FIG. 11 is a transverse section view taken along line 11—11 of FIG. 13 and illustrating the drive system for the rotary brushes at the washing station;

FIG. 12 is a section view taken along line 12—12 of FIG. 11 and illustrating an idler roller for the chain drive;

FIG. 13 is a top plan view of the washing station wherein the brushes have been moved back to illustrate the hold-down bands to retain the scallops in place during washing;

FIG. 14 is a transverse partial section view taken along line 14–14 of FIG. 13 and providing a frontal view of the rotary brushes and the support means therefor;

FIG. 15 is a section view taken along line 15—15 of FIG. 14 and again showing a washing brush together with spring means for tensioning the hold-down wire and bands;

FIG. 16 is a section view taken along line 16—16 of FIG. 13 and providing a frontal view of the hold-down system and blow-off nozzles;

FIG. 17 is a section view taken along line 17—17 of FIG. 16 illustrating the tensioning springs for the hold-down bands and wires;

DETAILED DESCRIPTION OF THE PREFERRED EMBODIMENT

Figure 1:
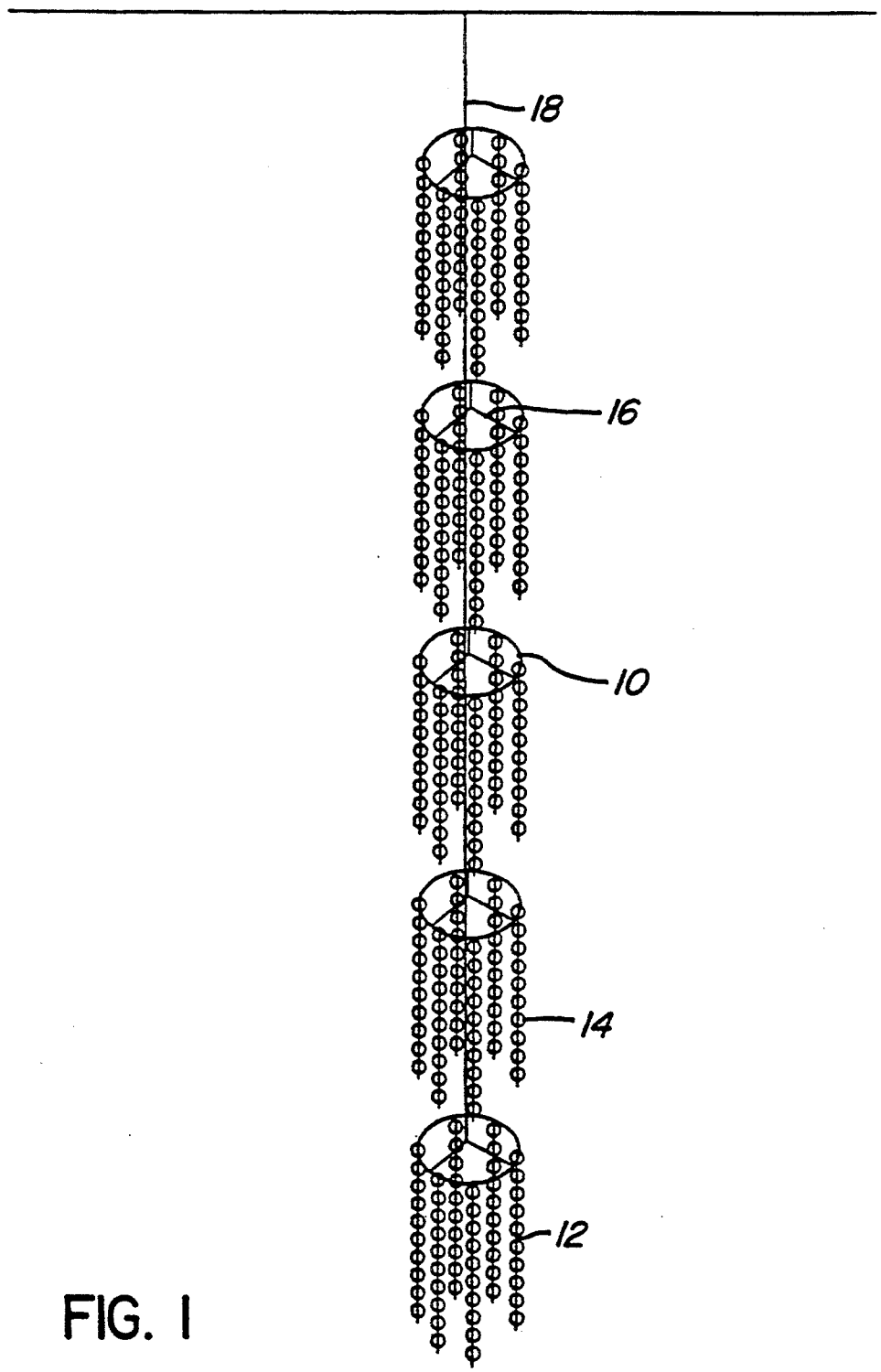

Referring now to the drawings, FIG. 1 shows groups of scallops in suspended culture. A plurality of hoops 10 are provided, each having attached to it several elongated strips 12 to which the scallops 14 are bonded in back-to-back spaced apart relationship. Each hoop 10 is provided with several radially extending connectors 16 which meet at the centre of the hoop with the centre points of these connectors being attached to an elongated suspension line 18. The upper end of the suspension line 18 is connected to a suitable buoy or platform.

Figure 2:
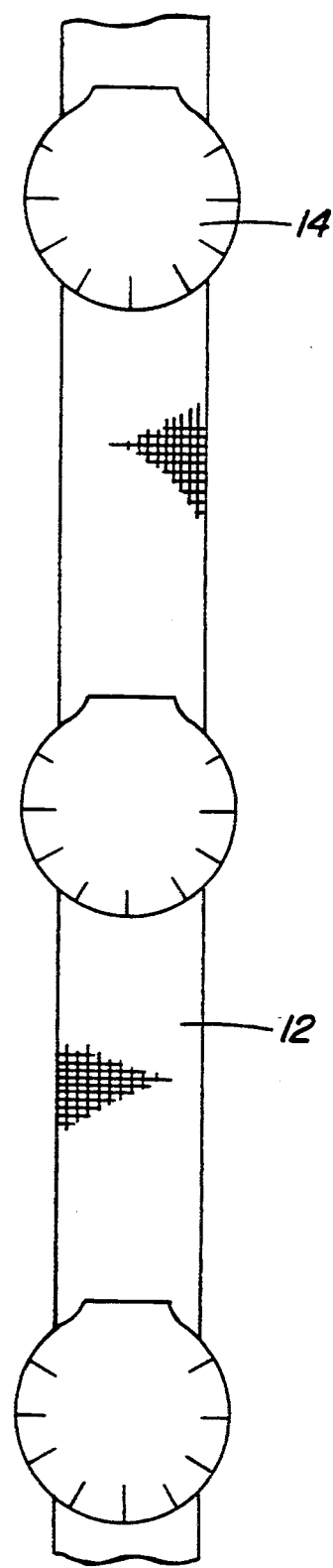
FIGS. 2 and 2A are frontal and side views respectively showing pairs of scallops bonded back-to-back on opposing sides of a flexible strip of material.
Figure 2A:
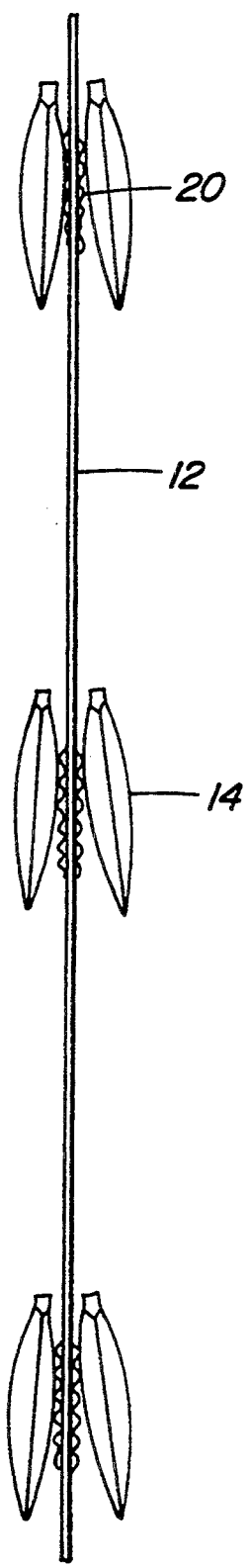

FIGS. 2 and 2A show the scallops 14 in greater detail bonded in back-to-back fashion to the elongated strip 12. The elongated strip 12 comprises plastic (polycarbonate) coated fibrous window (mosquito) screening. These strips 14 of screening proved to be sufficiently strong (breaking strength in excess of 13 kg. for a 3 centimeter wide strip) and provide an open matrix which allows the adhesive from the opposing scallop shells to co-mingle and set. The adhesive between the scallops is shown by the reference numeral 20. Since the juvenile scallops are relatively small at the time of bonding to the strips 12 (eg. 25 mm to 35 mm dia.) the bonding area on each shell is relatively small, eg. one square cm. Since the back or bottom face of a scallop is somewhat flatter than the convex top face, the juvenile scallops are bonded to the screen strip 12 and to each other in the bottom-to-bottom relationship previously mentioned.

GENERAL ASSEMBLY

Figure 4:
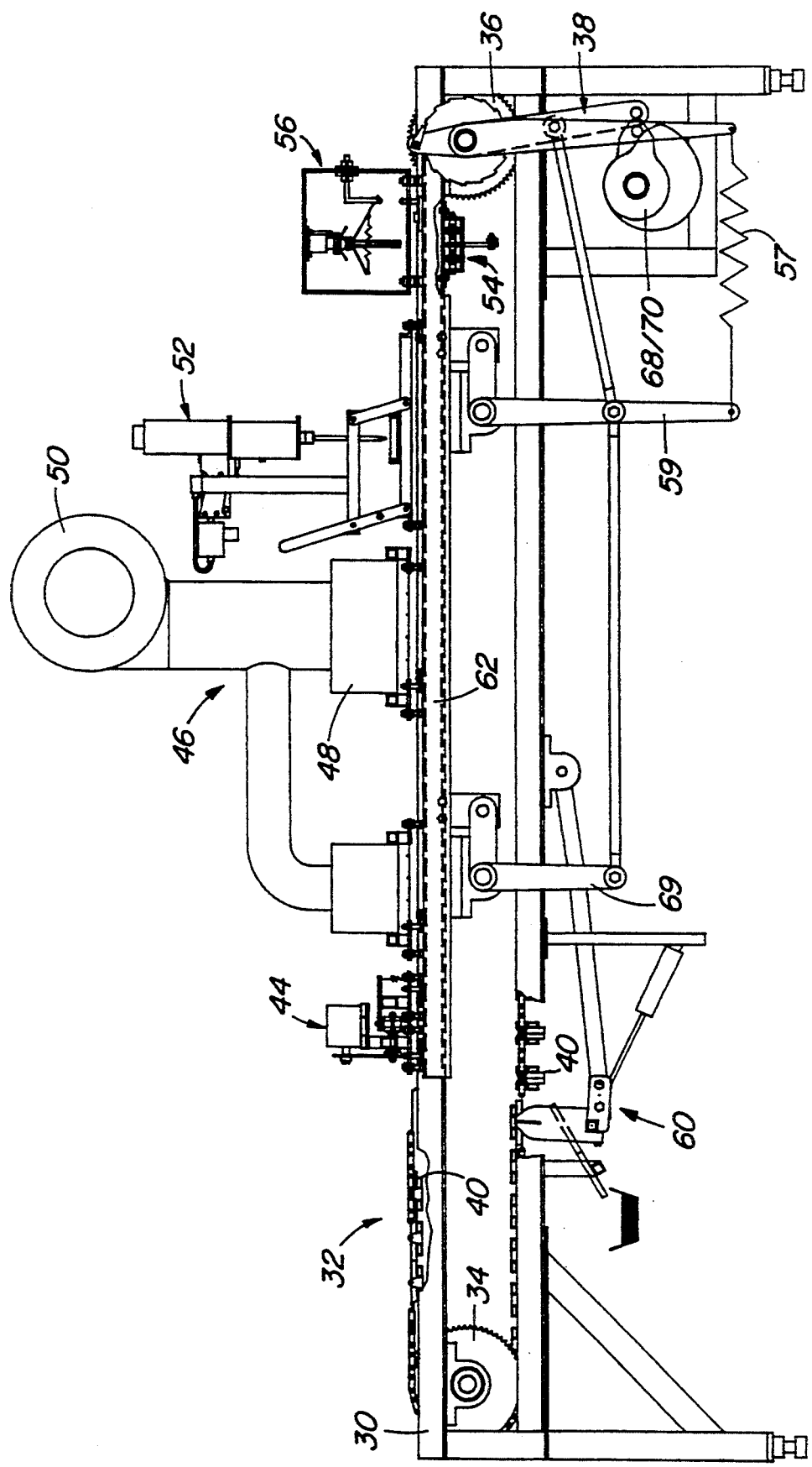
Figure 5:
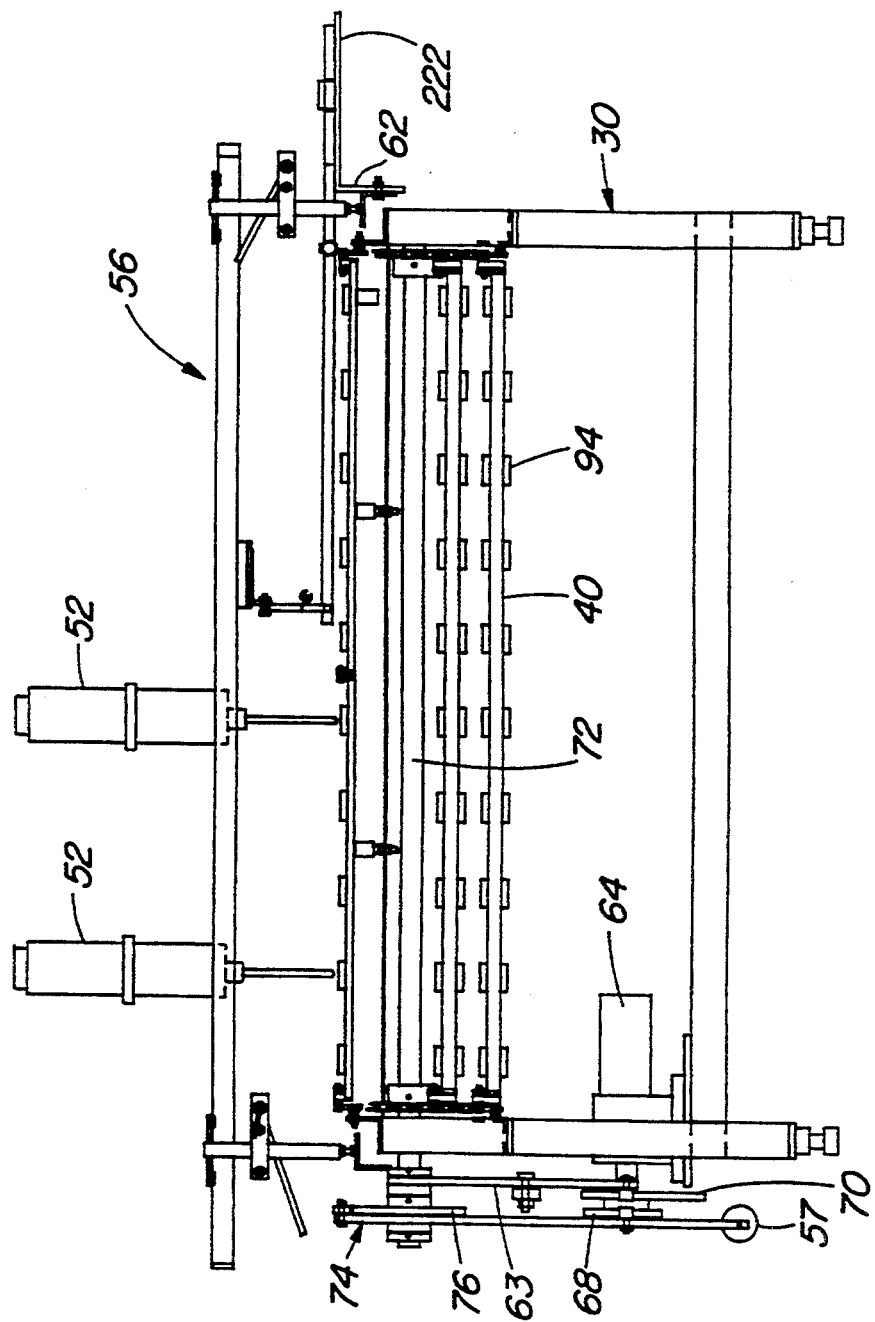
FIG. 5 is a partial end elevation view of the apparatus (the drier system is not shown and only a couple of glue guns are shown in phantom)

Referring now to FIGS. 3, 4 and 5 which comprise top plan, side elevation and front end views of the entire machine, it will be seen that the machine includes a sturdy elongated frame 30 which serves to support a conveyor 32, which conveyor 32 extends lengthwise of the frame 30. The conveyor includes upper and lower run and is supported from spaced pairs of sprockets 34, 36 located at opposing ends of the support frame 30. A conveyor drive system 38 moves the conveyor in a step-by-step fashion in its endless path of travel.

The conveyor 32 includes spaced pairs of elongated conveyor flights 40 each having seats 94 for holding a linear array of the objects (juvenile scallops) with said conveyor flights 40 extending transversely of the path of travel of the conveyor.

As will be described in more detail hereinafter, the flights 40 of each pair are pivotable relative to one another from an open position for loading of the objects on the seats 94 to a closed position wherein the seats of one conveyor flight 40 are brought into face-to-face correspondence with the seats of the opposing flight.

The juvenile scallops are manually positioned on the seats 94 of the conveyor flights at a hand-feed station labelled HFS in FIG. 4 and this requires the presence of three or four operators, depending upon the width of the machine, the number of seats per flight, and the rate of step-by-step conveyor travel.

The upper run of the conveyor is provided with a brush cleaning and compressed air blow-off station 44 in order to effect a thorough scrubbing of the top surface of each of the scallops supported on the conveyor. Following this, the scallops on the upper run of the conveyor pass beneath a drier system 46 including drier plenums 48 which span the upper run of the conveyor and provide air heated by electrical heaters and supplied from blower 50.

Following drying of the cleaned scallops, the conveyor advances the scallops beneath a multiplicity of adhesive applicators 52, each having a respective nozzle, one nozzle per seat, in order that a small measure of adhesive may be applied to the cleaned surface of each scallop shell.

Following application of the adhesive, the conveyor flights move to a position over a flight closure assembly 54 which sequentially effects movement of the conveyor flights 40 from the open to the closed position after each pair of flights arrives at the closure station in the course of the step-by-step movement of the conveyor 32.

A positioning means or puller for the flexible strip 12 is located at and above the closure station and is designated by reference numeral 56. The function of this device is to position the strip of material between the flights 40 of the respective pairs when they are in the open position and hold such strip so that the seats 94 of the flights come into face-to-face relation on opposing sides of the strip thereby to bring the scallops in the seats 94 into contact with opposing sides of the strip. They are hence held in that position as the conveyor moves along so that the adhesive previously applied to the surface of each scallop may cure or harden and form a bond between the scallops and the strip as described previously.

The lower or return run of the conveyor is provided with an opening system 60 which is located beneath the lower run of the conveyor fairly closely adjacent the rear end of the machine. The function of the opener 60 is to sequentially open the flights 40 of each pair and to release the scallops and the strip 12 to which they have become bonded by the adhesive. Suitable means effecting gentle release of the strip and bonded scallops from the opener are provided and will be described in greater detail hereinafter.

It is noted here that the cleaning and blow-off station 44, the drier system 46, strip puller 56 and the adhesive applicators 52 are all mounted to a vertically movable carriage 62 which is moved up and down in timed relationship to the step-by-step motion of the conveyor 32 in order to avoid interference between these systems and the scallops supported on the conveyor during the course of its movement.

All of the above sub-systems of the machine will now be described in greater detail with particular reference to the remaining FIGS. 6–46.

DRIVE SYSTEM

Figure 6:
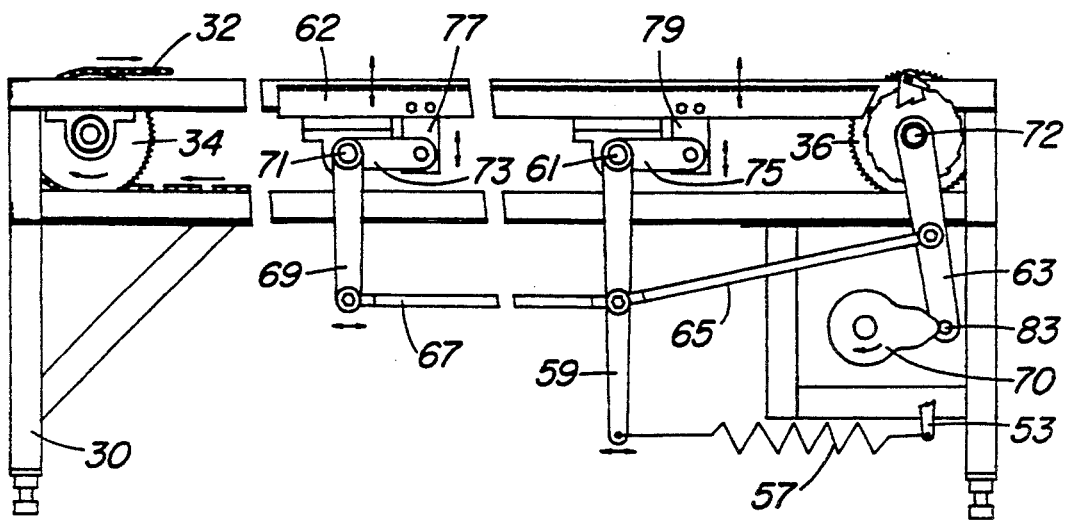
FIG. 6 is a side elevation view showing the main frame of the apparatus and the lift/drop carriage system.
Figure 6A:
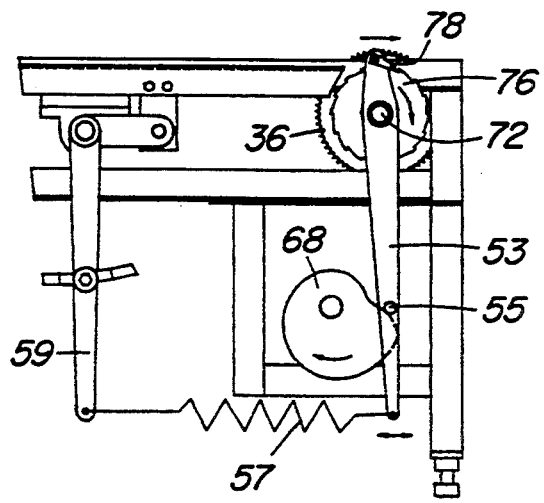
FIG. 6A is a partial side elevation view showing the main frame and the conveyor drive system.
Figure 7:
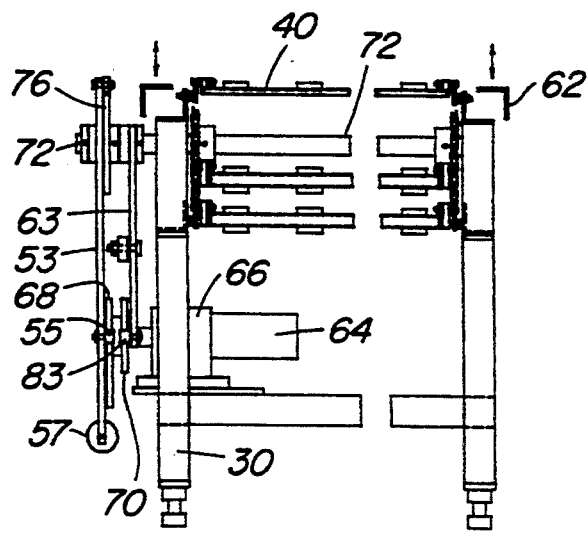
FIG. 7 is a partial end elevation view of the apparatus illustrated in FIG. 6.

With reference firstly to FIGS. 6, 6A and 7, the drive systems for the conveyor 32 and the lift/drop carriage 62 will now be described.

The conveyor drive includes a main drive motor 64 connected to a gear reduction unit 66 having an output shaft to which is secured a conveyor drive cam 68 and a carriage lift/drop cam 70. Toward the upper front of the frame 30 is journalled the main drive shaft 72 for the conveyor having mounted thereon the previously noted conveyor drive sprockets 36. One end of the main drive shaft 72 extends outwardly of the main frame 30 and serves to mount a number of components. Firstly, a ratchet assembly 74 is attached to the outer end of main drive shaft 72. Ratchet assembly 74 includes ratchet wheel 76 firmly keyed to drive shaft 72, which ratchet wheel 76 is driven in rotation by means of a pawl 78, the latter being pivotally connected to the upper end of a cam follower lever 53 which is pivotally mounted to the outermost end of drive shaft 72. The lever 53 is provided with a cam follower 55 which engages the perimeter of the conveyor drive cam 68. The lowermost end of the cam follower lever 53 is connected to moderately heavy coil tension spring 57, the rearward end of which spring 57 is connected to the lower end of the carriage lift/drop lever 59, the upper end of the latter being fixed to transverse shaft 61 which is journalled in brackets fixed to the main frame 30.

A second cam follower lever 63 is pivotally mounted at its upper end to the drive shaft 72 inwardly of the ratchet assembly 74. This follower lever 63 extends downwardly and is provided at its lower end with a cam follower 83 which engages the perimeter of the lift/drop cam 70 which, as previously noted, is fixed to the output drive shaft of gear reduction unit 66 along with the conveyor drive cam 68. The second follower lever 63 is connected adjacent its mid-point to a drag link 65 which, in turn, is connected to the mid-point of the previously noted lever 59. A further drag link 67 extends rearwardly and is connected to the lower end of a further lift/drop lever 69 which is again fixed at its upper end to a transversely extending shaft 71 journalled in suitable brackets fixed to the main frame 30. The shaft 61 and shaft 71 extend transversely of the machine and are provided at both ends with short crank arms 73 and 75, the outer ends of which are pivotally connected via short support plates 77, 79, to the respective side rails of the previously mentioned lift/drop carriage 62.

From the above description it will become apparent that as the cams 68 and 70 are rotated in unison by the main drive motor and its output gear box 66, that the associated cam follower levers 53 and 63 will oscillate back and forth in a direction given by arrows A and B. As the second follower lever 63 oscillates back and forth, the drag links 65 and 67 will be correspondingly oscillated along with levers 59 and 69 and their associated shafts 61 and 71 hence causing, via the previously mentioned crank arms 73, 75 and support plates 77 and 79, vertical movement of the lift/drop carriage 62 on both sides of the machine. The degree of vertical motion is typically in the order of 1.25 inches, depending of course on the precise design of the machine and upon the design of the cleaning station 44, drier system 46, adhesive applicator 52 and strip positioning system 56 all of which are mounted to carriage 62 for vertical motion therewith in timed relation to the step-by-step motion of the conveyor 32.

Returning now to the conveyor advance system, it will be noted that as conveyor cam 68 is rotated, that the high point on conveyor cam 68 will cause the cam follower lever to be oscillated counterclockwise as seen in FIG. 6A with the result being that the pawl 78 rides freely over the adjacent tooth of ratchet wheel 76. When the high point of conveyor cam 68 passes the follower 55, the tension spring 57, which has, up to this point in time, been stretched outwardly to store energy, now begins to rotate the cam follower lever 53 in the clockwise direction with the result being that pawl 78 engages the next adjacent ratchet tooth thus causing ratchet wheel 76 to rotate the main drive shaft 72 and the conveyor sprockets 36. Hence, the conveyor advances one step. The conveyor cam 68 and the lift/drop cam 70 are contoured and angularly arranged relative to each other on the output drive shaft such that the lift/drop carriage 62 reaches its highest point of vertical movement just prior to the start of the forward advance motion of the conveyor thus ensuring that the several components mounted on carriage 62 do not physically interfere with the scallops being moved along by the conveyor.

It is also worthwhile noting in particular that it is the energy stored in tension spring 57 which actually serves to advance the conveyor in its step-by-step motion. Hence, should some obstruction occur which inhibits the advance of the conveyor, the force applied cannot exceed the tension force applied by spring 57 and hence breakage of machine components which might otherwise occur if a positive drive system were used is substantially avoided. This same spring acts as a counterbalance for the carriage 62. Spring 57 is at maximum tension just as the carriage lifts and the tension in the spring drops as the conveyor advances so the carriage can drop quickly into its lower position without a bounce at the bottom of the stroke.

CONVEYOR SYSTEM

The conveyor system will now be described in greater detail. As noted previously, conveyor 32 runs in an endless path, having upper and lower runs, with roller-link conveyor chains 80 defining the marginal edges of the conveyor with these conveyor chains 80 being trained around the previously mentioned sprockets 34, at the rear end of the machine, and the drive sprockets 36 at the front end of the machine. The previously noted conveyor flights 40 extend between and are connected to the conveyor chains 80 by virtue of pivot pins 82 which extend through the conveyor chain links at spaced apart intervals. The upper runs of the conveyor chains and the flights 40 supported thereon are supported on low-friction slide plates 81 (FIG. 11) which extend along the main frame 30 and are bolted to it.

With reference now to FIGS. 8–10 and 31, the conveyor flights 40 will be described in further detail. As noted previously, the conveyor fights 40 are arranged in spaced apart pairs, the flights of each pair being pivoted relative to each other about an offset axis defined by the pairs of hinge plates 84 through which the aforementioned end pivot pins 82 extend together with an intermediate pivot pin 82'. One of each of the pairs of hinge plates 84 is rigidly affixed to one flight of each pair while the other hinge plate 84 is rigidly affixed to the other flight of that pair. It will readily be seen from FIGS. 8–10 and 31 that the axis defined by the pivot pins 82, 82' is offset from the flights by a substantial distance. Individual flights 40 include a rigid support bar 86 each comprising a hollow tube of rectangular section thereby to provide a substantial degree of rigidity while at the same time being fairly light in weight. Each pair of flights is provided with a generally C-shaped flat spring 88. The spring is designed such that the opposing ends of the spring 90 are biased toward each other. These opposing ends of the spring 90 are provided with short tabs (not shown) which fit into small slots provided in each of the support bars 86. With reference now to FIG. 8 it will be seen that as a result of the offset pivot axis noted previously, the spring 88, being located on the side of the two flights which is away from the pivot axis, serves to bias the conveyor flights 40 toward the open position. This serves to provide the conveyor flights with a stable open position. However, the biasing force of the spring 88 may be fairly readily overcome when forces are applied to the conveyor flights (as will be described in detail hereinafter with reference to FIGS. 31–36) and hence the flights may be brought into the closed positions shown in FIG. 10. In this position, the ends of the flat spring 88 which engage the respective support bars 86 of the two flights, are now seen to be located above the pivot axis defined by the previously noted pivot pins 82 and 82'. Hence the spring 88 urges the flights 40 Of the pair together thus providing a stable closed position. The spring 88 should be just strong enough as to maintain the conveyor flights in reasonably stable open and closed positions. If the spring is made too strong, the conveyor flights will tend to snap closed too rapidly thus dislodging shellfish therefrom as will be described in greater detail in connection with FIGS. 31–36.

With further reference to FIGS. 8–10, it will be seen that each flight 40 further comprises a multiplicity of resilient foam rubber cups or seats 94. Each of these seats 94 is shown as being of a generally rectangular outline shape having in its centre a generally circular concave recess which is of just sufficient size as to receive a convexly contoured shell of the juvenile scallop to be received therein. The individual foam rubber cups 94 are bonded to the support bars 86 by means of any suitably compatible adhesive such as 3M's "SUPER 74".

The strip of material 12 to which the scallops are ultimately adhered is shown in FIGS. 8–10 - in FIG. 8 in the position in which it is located under tension just prior to closure of the conveyor flights and, in FIG. 10, in the position it occupies after the flights have been closed and the scallops in the respective seats 94 brought into engagement with opposing sides of the strip. The means for accomplishing all of this will be described in detail hereafter.

In order that the respective conveyor flights may be connected to the conveyor chains 80, spaced apart links on the chains 80 are drilled through to receive the pivot pins 82 at the opposing ends of the pairs of flights. Suitable means, such as a snap-ring or "Circlip" may be provided on the ends of the pivot pins 82 to prevent their escaping from the respective conveyor chains 80.

CLEANING SYSTEM

The brush cleaning and blow-off station 44 will now be described in some detail with reference to FIGS. 11–17. It might be noted here that the basic purpose of the cleaning station 44 is to scrub the glueing surfaces of the scallop shells to remove any film or extraneous material to the extent reasonably possible prior to drying and bonding. For this purpose, the cleaning station includes a multiplicity of rotary cleaning brushes 100 each journalled for rotation in suitable bearings mounted in a transverse support beam 102. The opposing ends of support beam 102 are mounted to suitable brackets 104 which in turn are supported from the lift/drop carriage 62. Each brush 100 is located so as to come into alignment with a respective one of the seats 94 of a conveyor flight 40 as the conveyor moves along in step-by-step fashion. The individual brushes are provided with radially extending bristles which are reasonably stiff so as to give the surface of each scallop a strong scrubbing action but not so strong as to damage the shell or to eject the shell from its foam rubber seat. The individual brushes 100 are positively driven in rotation by sprockets 104 mounted to the brush drive shafts with an elongated drive chain 106 extending lengthwise of the support beam 102 and being trained around a series of idler rollers 108, pairs of which idlers being disposed in flanking relation to the drive sprockets 104. The drive chain 106 is driven from a main drive sprocket which in turn is driven by a brush motor 110 having an output gear box 112 connected to it and driving output chain and sprocket set 114.

With reference to FIG. 13, the cleaning station is provided with a second transverse support beam 120. This beam 120 supports the hold-down band and hold-down wire assemblies. It must be kept in mind that during the cleaning process, the shellfish are subjected to substantial forces tending to move them out of the foam rubber cups 94. Hence, during the scrubbing process, each shellfish is engaged on its upper surface by a pair of transversely extending thin steel bands 122. These hold-down bands 122 are maintained in tension by means of coil tension springs 124. The hold-down bands 122 extend beneath a plurality of transverse rods 126 which rods are disposed in flanking relationship to the positions occupied by the respective seats 94 on the conveyor flights. These rods 126 extend transversely to the support beam 120 and, on the forward side of the support beam 120, there extends a thin hold-down wire which is maintained in tension by a series of tension springs 130 (see FIG. 16). Also, as seen in FIG. 16, there is provided a series of blow-off nozzles 132 each nozzle being aimed at a respective conveyor flight seat 94 for blowing off excess water from the surface of the scallop shell after the scrubbing process.

Suitable spray nozzles (not shown) are provided, one for each rotary brush 100, thereby to supply a small stream of water to the perimeter of each brush during the brushing operation.

During operation, as the conveyor 32 advances step-by-step, the entire cleaning station 44 is raised upwardly and downwardly. As it is lifted upwardly, the hold-down bands 122 and the hold-down wire 128 are lifted clear of the scallops located in the conveyor flight seats 94. The conveyor then moves forwardly to bring the next group of seats beneath the hold-down bands whereupon the entire cleaning station moves downwardly thus bringing the hold-down bands 122 into engagement with the scallops but leaving the central portions of the scallops exposed so that the brushes 100 can effect a thorough cleaning of same as illustrated generally in FIG. 13. When the conveyor moves forwardly one step, the previously scrubbed scallops come to positions beneath the nozzles 132 and the scallops are then pressed downwardly into their seats by the hold-down wire 128. Since the hold-down wire is of quite small diameter, it does not interfere with the blow-off process.

DRIER SYSTEM

As the washed and scrubbed scallops are moved along step-by-step by conveyor 32, the scallops are brought into the drier system 46. Although two plenum chambers 48 are shown in FIG. 4, only one plenum chamber, the downstream one, will be described with reference to FIGS. 18–20.

Figure 18:
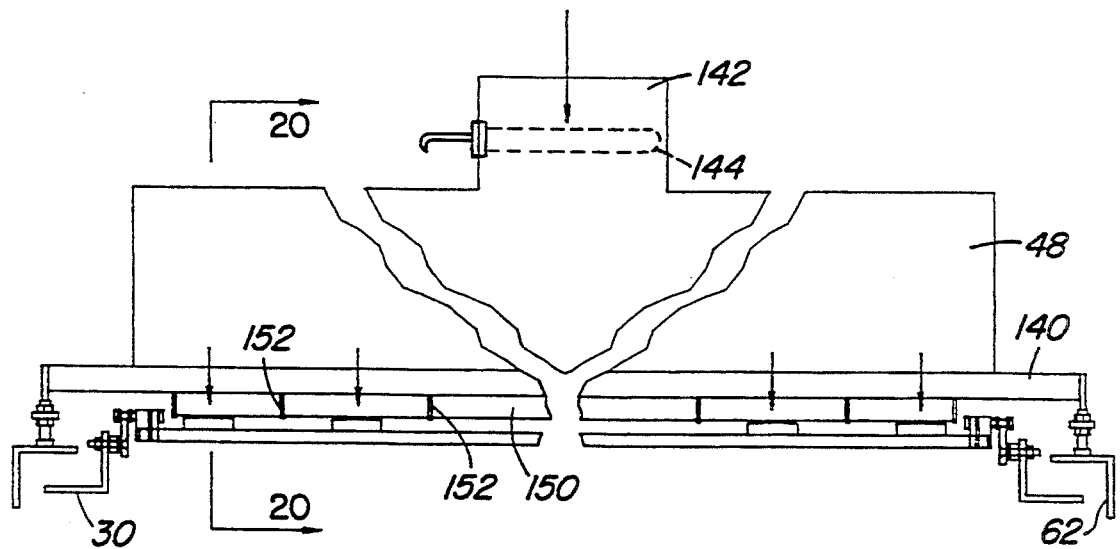
FIG. 18 is a front elevation view of the drier plenum and also illustrating portions of the conveyor system and hold-down wires.

With reference to FIG. 18, the plenum chamber 48 comprises a rectangular box-like structure which spans the conveyor 32 and is supported from lift/drop carriage 62 by means of a pair of transversely extending beams 140. The upper inlet end 142 of the plenum chamber receives a flow of air from the previously noted blower 50 and this air moves through a bank of electric heater elements 144 thereby to warm the air to the desired temperature (e.g. 30° C.).

Figure 19:
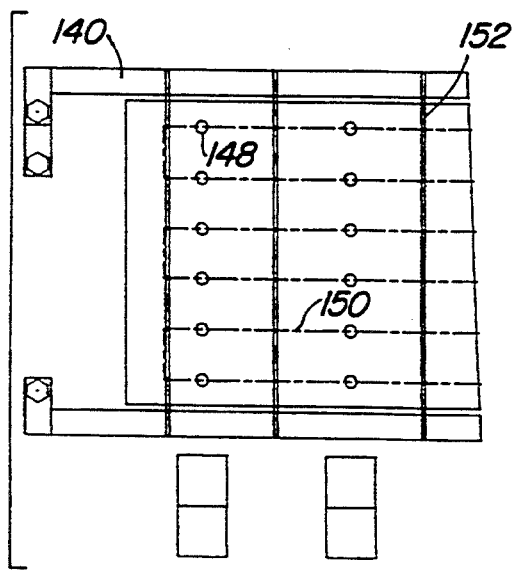
FIG. 19 is a partial bottom view of the drier plenum showing holes in the bottom of the plenum as well as the hold-down wires (in phantom)
Figure 20:
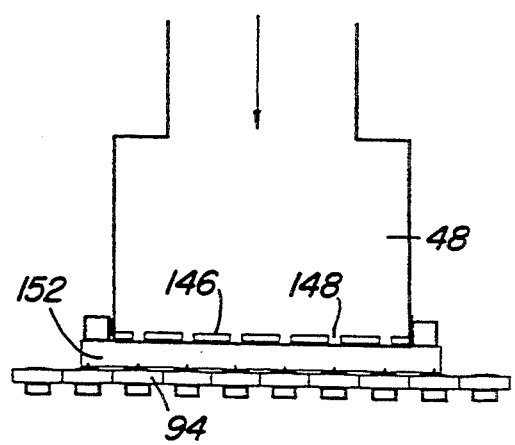
FIG. 20 is a section view of the plenum taken along line 20—20 of FIG.

With reference to FIGS. 19 and 20, the bottom wall 146 of the chamber is provided with a series of spaced apart apertures 148 each typically having a diameter of about 13mm. These apertures 148 are spaced and located so that each one is directly centered with a respective seat 94 on the conveyor flights. Hence, as the conveyor moves along in its step-by-step fashion, the scallops located on the seats 94 are sequentially brought directly beneath the apertures 148 through which jets of warm air are emitted thus effecting thorough drying of the scallop shell surfaces.

To provide for ease of fabrication of the bottom or floor of the plenum chamber, the same is typically made from a plastic sheet in the order of 0.25 inches thick although any suitable material may be selected.

In order to hold the scallops on their respective seats and to prevent the scallops from opening during the course of the drying operation, the bottom of the plenum chamber is provided with a plurality of tensioned hold-down wires 150, which wires extend in alignment with the centres of the apertures 148. Suitable tension springs (not shown) maintain the hold-down wires 150 under a suitable degree of tension. Furthermore, in order to avoid excess upward deflection of the hold-down wires during operation, the bottom of the plenum chamber is provided with a series of transversely extending hold-down plates 152 which are disposed in fling relation to respective laterally disposed rows of apertures and against which the hold-down wires bear.

Because of the relatively small diameter of the hold-down wires 150, they do not interfere in any way with the drying operation and allow a free-flow of dry air toward and over that area of each scallop to which the adhesive is to be subsequently applied as will be hereinafter described.

ADHESIVE APPLICATORS

Reference will now be had to the adhesive applicator system 52 which was broadly mentioned previously. The precise design of the adhesive applicator system will depend upon the type of adhesive ultimately selected. Generally speaking, the adhesive composition should be compatible with the material of the strip 12 and the composition of the scallop shells. It should be able to maintain a good bond for a relatively long period when exposed to seawater. The length of exposure time to seawater will depend upon the length of the grow-out period which can be as much as 18 months with the colder North Atlantic waters requiring the longest grow-out times. It should be noted however that the selection of the most suitable adhesives for any given set of circumstances is beyond the scope of the present specification. The description will proceed with a two-pan epoxy system being used as the adhesive.

Figure 21:
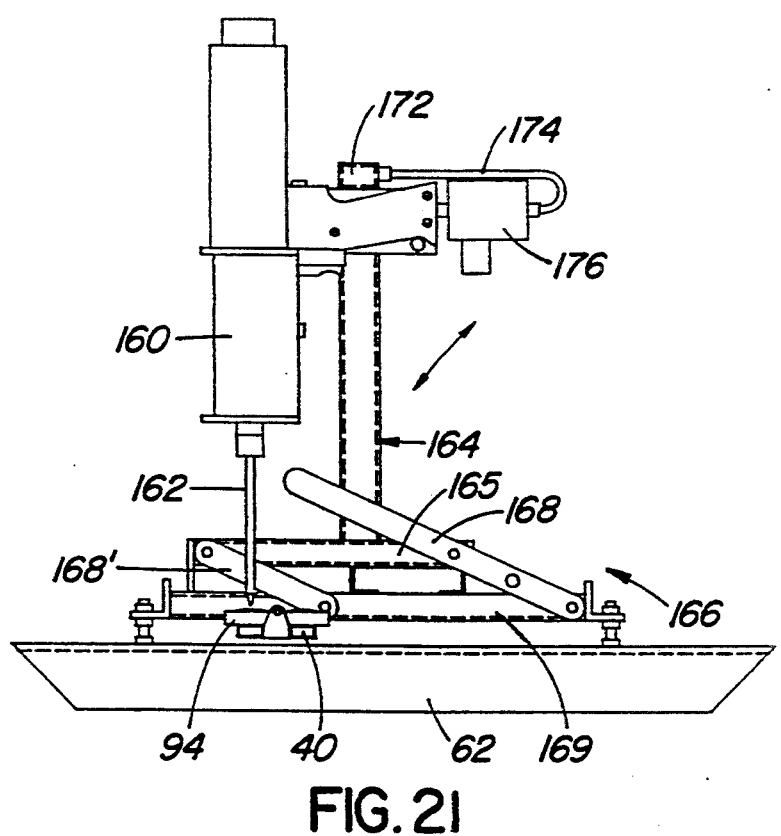
FIG. 21 is a side elevation view of a conventional adhesive applicator and the mounting assembly therefor.
Figure 22:
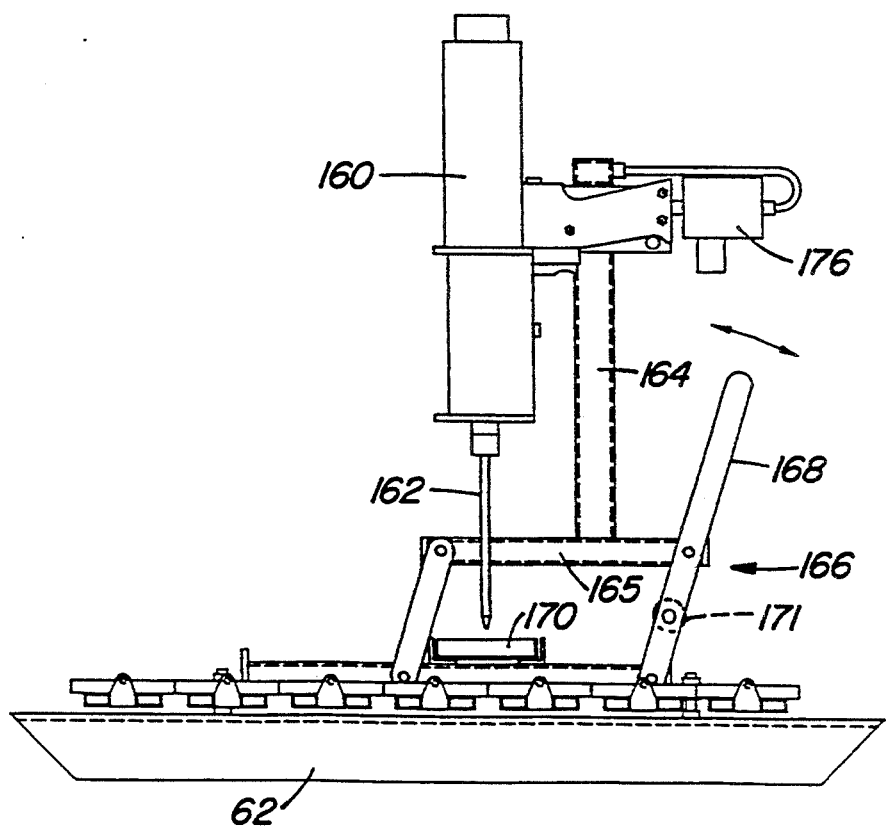
FIG. 22 is a view similar to FIG. 21 but showing the adhesive applicator in an up position above a scrap tray.

With reference now to FIG. 21 there is shown in side elevation a conventional two-part epoxy adhesive gun 160 having a conventional mixing tube 162 extending downwardly therefrom with its tip portion being located a very short distance above the upper surface of a scallop shell located on the foam rubber seat 94 of a conveyor flight. Since a measure of adhesive is to be applied to the upper surface of each scallop shell right across the machine, one adhesive gun 160 for each conveyor flight seat is provided, in this particular case 10 in number.

The adhesive guns 160 may be of any well known commercially available variety such as provided by the "MIX PAC" system using the 200 cc size cartridges. The gun was manufactured by W. A. Keller Prozesstechnik C. H., Switzerland, Model #DP 200-70. Another system of equal consideration is the "Ratio-pak". With both systems the cartridge size varies from 50 cc (25 cc per component) to 1.5 liter (750 cc per component). These types of systems are best suited for low volume production rum. For higher volume runs a metering pump system, pumping the 2 components from large cans, would provide a more cost-effective system. Two such systems are the "Posiratio" and "Twinflow" systems. The two pan epoxy mixture will be selected to have a set-up time which is preferably slightly in excess of 5 minutes as discussed in more detail hereafter.

With reference again to the adhesive guns 60, it will be noted that they are mounted to an upright support post 164, the lower end of which is attached to a parallel arm linkage 166. Linkage 166 includes a base member 165 to which the lower end of support post 164 is affixed, and end links 168 and 168' which, together with the bottom horizontal member 169, completes the parallel arm linkage. Link 168 has an extended arm portion allowing it to be grasped by the user and swung clockwise from the position shown in FIG. 21 to the position shown in FIG. 22. All of the linkage arms 168 are connected together across the machine by virtue of a transverse shaft 171 with the result being that the parallel arm linkages 166 for all the adhesive gum 160 are activated simultaneously thereby bringing the adhesive guns 160 to the upward raised positions shown in FIG. 22. The reason for this raised position is that provision must be made for the adhesive, in the case where a two-part epoxy is being used, to be pumped through the mixing tube 162 of each gun even when the operation of the machine has been temporarily disrupted for some reason or another to thus avoid setting up of the adhesive within the mixing tubes. For this purpose, an elongated scrap tray 170 capable of extending across the machine is immediately put into place beneath the mixing tubes of the several guns thereby to receive this waste adhesive. As soon as operation of the machine is ready to be resumed, the parallel arm linkage mechanism is swung forwardly into the operative position shown in FIG. 21. The parallel arm linkage and scrap tray can of course be omitted in the case where an adhesive is used which does not tend to set-up in the mixing tubes.

It will also be noted that the several adhesive guns 160 are connected together and further stabilized by means of a transversely extending hollow cross member 172. The hollow cross member 172 serves also as an air supply manifold to the glue guns 160. This manifold is connected to a suitable source of compressed air (not shown). Each glue gun is provided with an individual air supply line 174 which is connected to a pneumatic valve assembly 176, each pneumatic valve being activated by signals received from the control system to be hereinafter described.

Accordingly, each time the conveyor stops in the course of its step-by-step motion, the several glue guns 160 each apply a small volume of adhesive (e.g. about 0.15 to 0.35 ml) to the upper surface of a respective one of the scallops supported on the conveyor flight directly below the adhesive applicators.

Regardless of the precise type of adhesive to be used, it should be capable of at least partially setting up within 5-10 minutes after application to the scallop surface. Complete curing while in the machine is not of course necessary—it is only necessary that the adhesive develop sufficient strength within this time as to maintain a strong enough bond between the scallops and the strip 12 as to avoid dislodgement of the scallops during normal handling after removal from the apparatus. This will become more apparent hereinafter. The slower the setting time for the adhesive used, the slower the machine will have to be operated and vise versa. The adhesive should have sufficient viscosity that it does not slump down and run over the surface of the scallop shell but should stand up as a small viscous volume or bead on the surface of the scallop shell thereby to provide good penetration into the material of the strip 12 and intermingling with the adhesive of the opposing scallop which is brought into face-to-face relationship during the course of closure of the conveyor flights as described previously.

STRIP PULLER AND FLIGHT CLOSURE

The strip positioning means or puller 56 will now be described in conjunction with the conveyor flight closure assembly 54. Both of these assemblies are located toward the front end of the machine as illustrated in FIGS. 4 and 5. These two assemblies 54 and 56 are illustrated in some detail in FIGS. 23-30 with the flight closure means being additionally illustrated in FIGS. 31-36.

Figure 27:
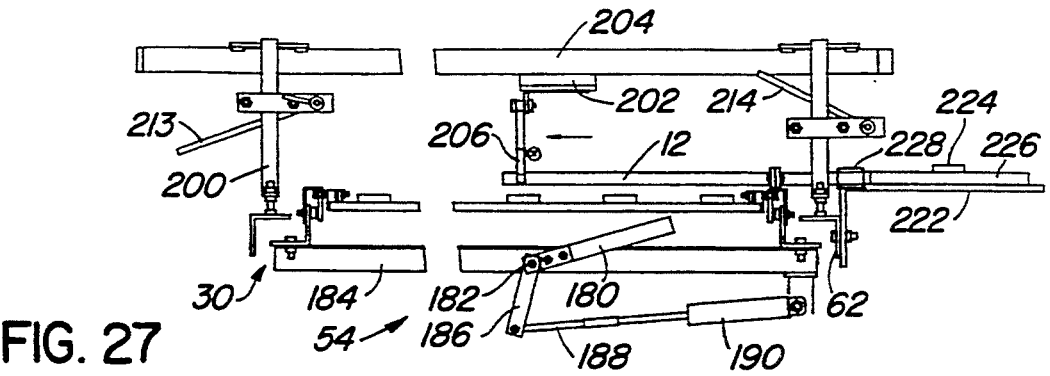
FIGS. 27–30 are a series of partial section views taken at the closure station and illustrating the closure of the conveyor flights and the action of the strip puller in timed relation to the action of the flight closure means.
Figure 28:
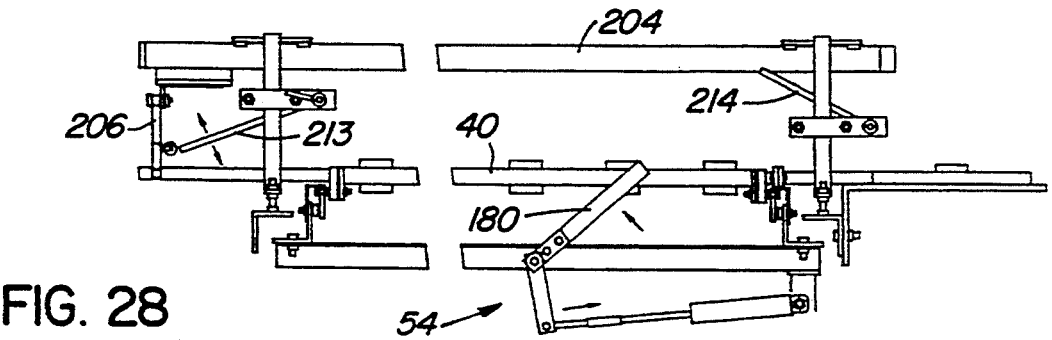

The conveyor flight closure means will first be described. The closure assembly 54 includes a spaced parallel pair of closure arms 180 pivotally mounted at pivot point 182 on a transverse support beam 184, the opposing ends of which are affixed to the main frame 30. The closure arms are fixed to a crank arm assembly 186, the distal end of the latter being connected to the extended rod 188 of pneumatic actuator cylinder 190. With reference to FIG. 27, the closure arms 180 are in their lowered position beneath the flights 40 of the conveyor which at this point are in the "open" condition. However, upon retraction of the rod of the pneumatic cylinder 190, the closure arms 180 are pivoted counterclockwise as illustrated in FIG. 28 thus engaging the flights 40 and moving same into the closed position.

Figure 31:
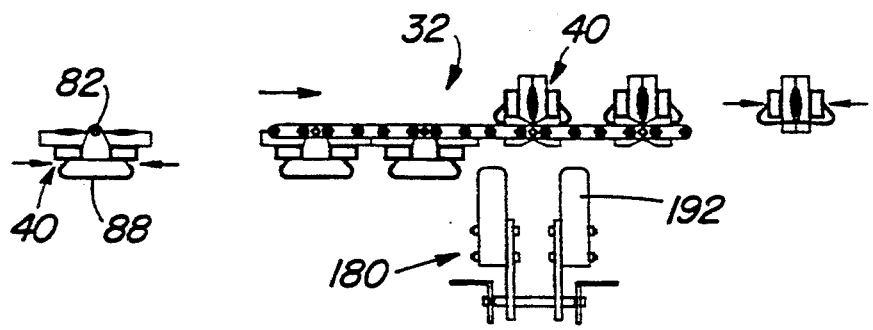
FIGS. 31 through 36 are a series of partial section views again illustrating the action of the flight closure assembly and the manner in which the closure of the conveyor flights from the full open to the fully closed position is effected.

With reference to FIG. 31 it will be seen that the distal ends of the closure arms 180 are provided with contact portions 192 of a synthetic plastics material such as structural "Nylon" in order that these portions 192 may make smooth low-friction engagement with the flights 40 of the conveyor.

With reference firstly to FIG. 31 it will be seen that, initially, the conveyor flights approach the closure assembly with the flights in the full open positions and the shellfish positioned in the respective seats 94. The closure arms 180 act sequentially on the respective pairs of conveyor flights 40 thus effecting closure of same with the previously described spring 88 retaining the pairs of flights in the closed position as they are moved by the conveyor away from the closure arms.

Figure 32:
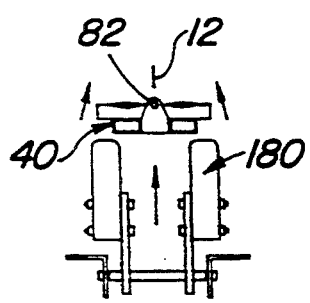
Figure 33:
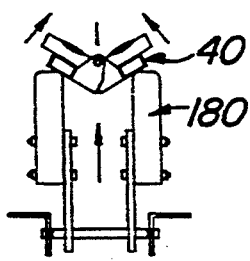
Figure 34:
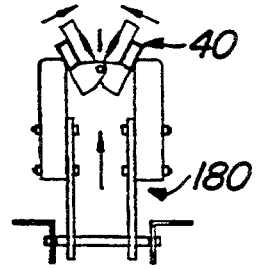
Figure 35:
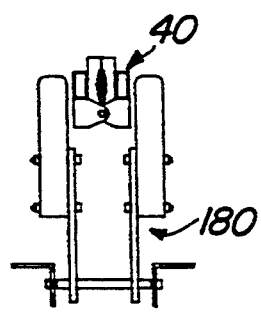
Figure 36:
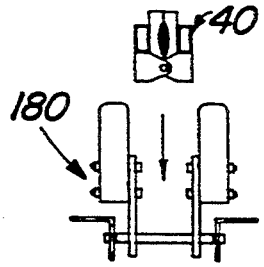
Figure 37:
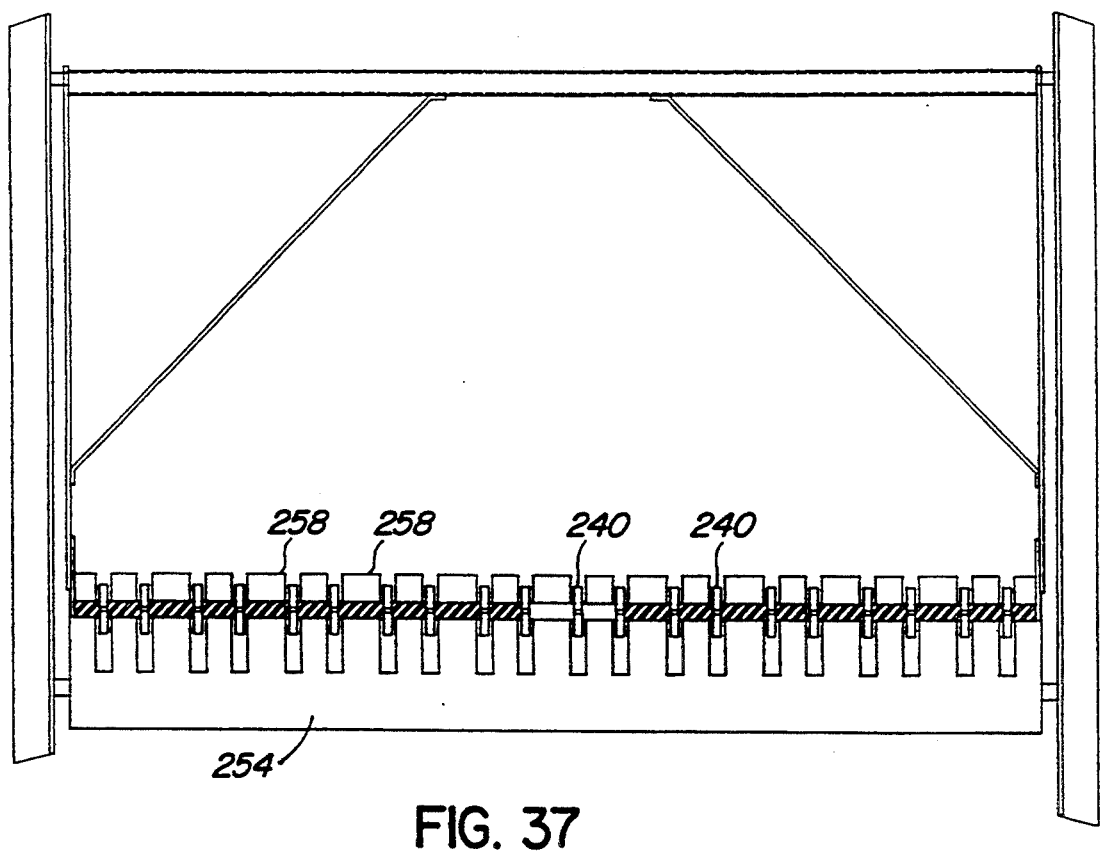
FIG. 37 is a top plan view of the apparatus for opening the conveyor flights and receiving and discharging the strips to which the scallops have become bonded.
Figure 38:
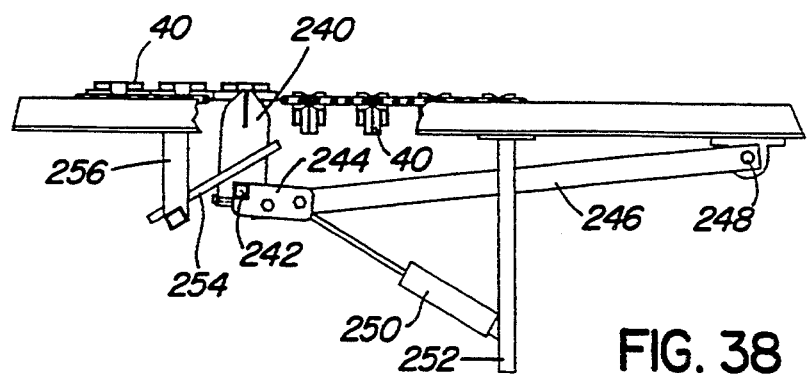
FIG. 38 is a side elevation view of the opener system showing the opener fingers and the comb through which they move.
Figure 39:
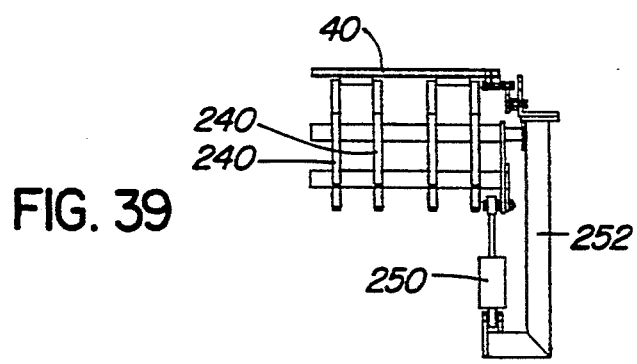
FIG. 39 is a partial end elevation view of the opener system showing one of the operating cylinders and associated equipment.

The sequence of action is shown in FIGS. 32-36 wherein, in FIG. 32 the conveyor moves the conveyor flights 40 into position and the closure arms 180 begin to move upwardly. With reference to FIGS. 33 and 34, the closure arms 180 contact the undersides of the conveyor flights 40 and the two flights pivot about the pivot axis defined by pivot pins 82, 82'. The uppermost position of the closure arms 180 is shown in FIG. 35 at which time the conveyor flights 40 are fully closed together following which, with reference to FIG. 36, closure arms 180 move downwardly and pivot back to the home position with, as described previously, the conveyor flights 40 remaining in the closed position with the shellfish being pressed against the intermediate strip 12 and against each other.

Figure 23:
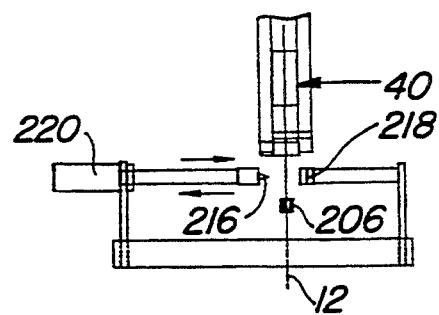
FIG. 23 is a partial top plan view toward one end of the strip or band puller showing the cut-off knife assembly.
Figure 24:
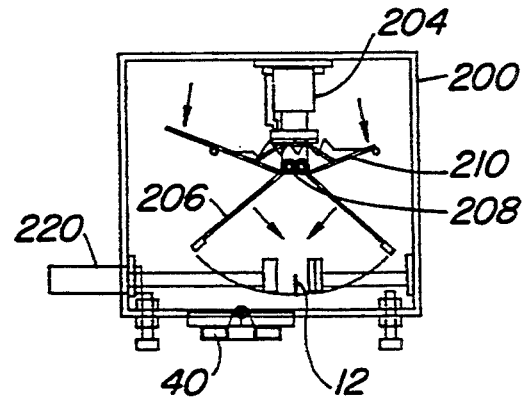
FIG. 24 is an end elevation view of the strip puller showing the puller fingers in the open position.

Turning now to FIGS. 23-30, the strip puller assembly 56 will be described. The strip puller is mounted on a framework 200 which in turn is mounted to the lift/drop carriage 62. The assembly includes a car 202 which is capable of movement transversely of the conveyor from one side to the other, with the car in the preferred design supported and driven by a so-called rodless cylinder 204, such rodless cylinder being activated by compressed air and controlled by a pneumatic control valve (not shown). The rodless cylinder 204 is of a well known commercially available variety such as "ORIGA", "TOL-O-MATIC" or similar. The car has a downwardly extending bracket upon which a pair of puller fingers 206 are pivotally mounted. The proximal ends of fingers 206 are fixed to respective intermeshed spur gears 208 which constrain the fingers 206 for pivotal movement together in unison. Each finger 206 also has affixed thereto at a suitable angle relative to each finger, an operator arm 210, one such operator arm being longer than the other. The operator arms 210 are interconnected together by way of a coil tension spring 212. This tension spring 212 provides the fingers with an over-centre bi-staple snap action effect. Hence, as seen in FIG. 24, the fingers 206 are in their full open positions and it will be seen that the tension spring 212 is biasing the operator arms toward one another thus holding the fingers 206 apart. However, in FIG. 26, it will be seen that the fingers have moved to the fully closed position and they are biased into that position again by the action of tension spring 212 on the operator arms 210.

Figure 29:
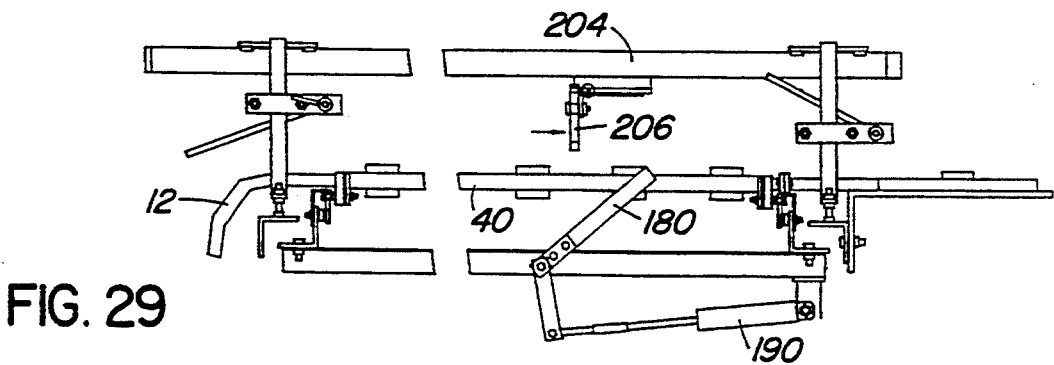

An additional function of the elongated operator arm 210 is to make contact with the opener and closure rods 213, 214 respectively which are mounted to the support frame at opposing ends of the stroke of car 202 as illustrated for example in FIG. 27. When the carriage 202 has reached the extreme end of its path of travel as illustrated in FIG. 28, after having pulled the strip 12 transversely of the machine, the operator arm 210 is positioned just outwardly beyond the opener rod 213. When the carriage reverses its direction, the operator arm 210 slides up the opener rod 213 and the tension spring 212 causes the fingers 206 to snap into the open position whereupon the car returns to the home position without any interference between fingers 206, which are now in the raised positions, and the conveyor flights 40 etc. This is illustrated in FIG. 29. When the carriage 202 returns to the home position, the operator arm 210 slides down the closure rod 214 and the spring 212 causes the fingers 206 to snap together into the closed position at which point they close firmly on the outer end of the strip 12.

Figure 25:
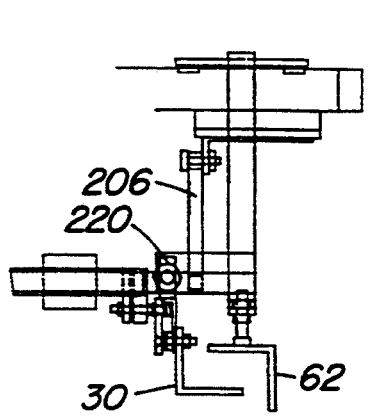
FIG. 25 is a front elevation view of one end of the strip puller including an end view of the cylinder for the cut-off knife.

With reference to FIGS. 23 and 25, the strip puller assembly includes a strip cut-off knife 216 which co-acts with anvil 218 to sever the strip 12 after the strip has been engaged between the closed conveyor flights. The knife 216 is mounted on the distal end of the rod of pneumatic cylinder 220 and both the cylinder and the anvil 218 are mounted on a suitable support bracket ultimately affixed to the lift/drop carriage 62. The pneumatic cylinder is of a type having a hexagonal rod with a spring return, e.g. one such as is made by Clippard or Bimba.

Figure 30:
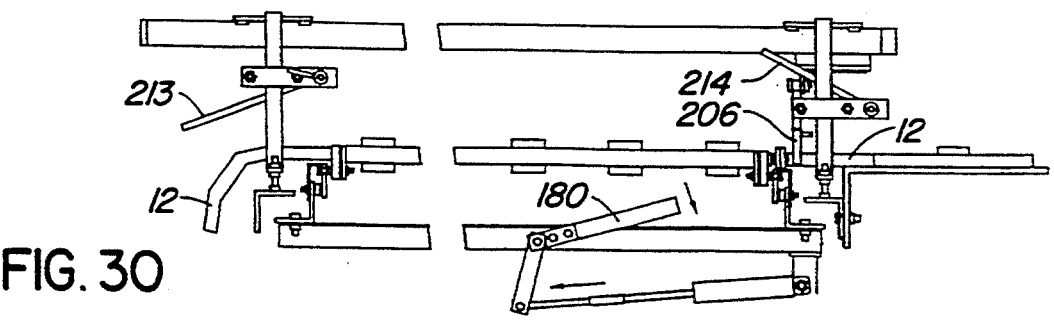

The interaction of the strip cut-off knife, the strip puller and the closer will now be described. The end of the strip 12 is held by the fingers 206 and pulled to the left by the car 202 which can be seen in FIG. 27. The car reaches the end of its travel so the strip is extended across the machine and the closer arms 180 pivot upwardly, thus, closing the conveyor flights with the result being that the strip 12 is trapped between the shellfish carried on the respective conveyor flights 94 as illustrated in FIG. 28 and FIG. 35. The rodless cylinder 204 is activated to move the car 202 to the fight, causing the fingers 206 to open and release the end of the strip 12 which hangs down as illustrated in FIG. 29. At the same time, the cut-off knife 216 is activated to sever and release the strip now being held by the conveyor flights 40. The closer arms also return to the home position so the conveyor is free to advance as illustrated in FIG. 30. The knife remains in contact with the anvil so the free end of the strip is held in position pinched between the knife and the anvil. The car 202 reaches the home position and the fingers 206 snap closed on the free end of the strip behind the knife as illustrated in FIG. 25 and FIG. 30. The knife 216 retracts, clearing the path for the fingers to move to the left again pulling the strip 12 out between the knife and the anvil which starts the cycle again. All operations are coordinated to the movement of the lift/drop carriage and the step-by-step advance of conveyor 40 which is described in more detail in the following section on the control system.

The strip supply means includes a horizontal shelf 222 (FIGS. 27-30) which is bolted to the lift/drop carriage 62. The shelf includes a upstanding central hub 224 which serves to mount a coil 226 of the strip material. As the strip 12 passes from coil 226 outwardly to the strip puller, it passes through a strip tensioner 228 which will now be described with reference to FIG. 26A.

Figure 26:
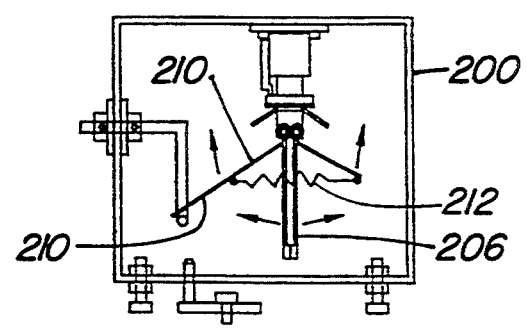
FIG. 26 is a view similar to FIG. 24 but with the puller fingers shown in the closed position.
Figure 26A:
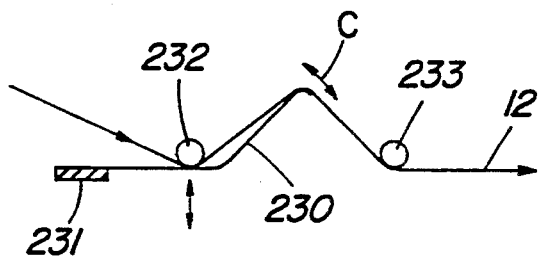
FIG. 26A is a view of a strip tensioning means.

The strip tensioner 228 must retain the tension in the strip while it is being pulled across by the puller mechanism and retain the tension even when the puller hits the end of its stroke. Inertia would tend to make the strip slump at the end of the stroke. The tensioning device shown in FIG. 26A is very simple and effective. The tensioning spring 230 of flat spring steel located between small guide rollers 232 and 233 performs the function of a dancing roller and brake mechanism. The tensioning spring also pulls up the slack at the end of the stroke to ensure that the strip is tight and straight when the conveyor flights close as described previously. The tensioning spring is securely fastened at point 231, and the end of this flat spring can flex in the direction of a arrows C shown in FIG. 26A. When the car 202 starts to pull the strip 12 to the right in FIG. 26A, the tensioning spring 230 initially starts to flex between the roller 232 and the free, rounded end of the tensioning spring. As the tension in the strip 12 increases, the spring 230 eventually starts to flex from the anchored end 231 and it pulls away from the roller 232 which releases the strip so it can be pulled off the roll 226. When the car 202 hits the end of its travel the strip 12 stops almost immediately, but the coil slips ahead a small amount due to inertia, and the tension in the strip decreases. As the tension decreases, the tensioning spring moves back, first contacting the roller 232 which acts as a brake and holds the strip in position. The end of the tensioning spring beyond the contact point with the roller 232 continues to move up, back to it original position which restores and maintains the tension and position of the strip above the conveyor 40.

CONVEYOR FLIGHT OPENER AND DISCHARGE SYSTEM

The apparatus for opening the conveyor flights and discharging the scallops which have become bonded to the strip 12 will now be described with reference to FIGS. 37-45.

As noted previously, the conveyor flight opener 60 is positioned below the bottom run of conveyor 32 remote from the front end of the machine. Since the distance from the flight closure assembly 54 to the flight opener 60 in conjunction with the rate of movement of conveyor 32 determines the time available for curing of the adhesive to the required degree, it is obvious that this distance should be maximized to the extent reasonably possible thereby, for any given adhesive type, to allow the maximum rate of conveyor travel.

The flight opener assembly 60 includes a multiplicity of opener fingers 240 disposed transversely of the machine and which are spaced apart so as to enable the fingers 240 to come into flanking relationship with the seats 94 on the respective conveyor flights. The opener fingers 240 are fixed to a transverse support bar 242 the opposing ends of which are mounted on suitable brackets 244 which in turn are connected to pivoting finger support arms 246, the latter being pivoted at pivot axis 248 to the machine frame. Actuating cylinders 250 interconnected between brackets 244 and downwardly extending struts 252 affixed to the main frame serve to effect up and down movement of the opener fingers 240 around the previously noted pivot axis 248.

The fingers 240 interact with an elongated comb 254 which is in the form of an elongated plate extending transversely of the machine and supported on brackets 256 in the inclined position shown in FIG. 38 and FIGS. 40-45. The comb 254 is provided with spaced apart slots 258, each accommodating a respective one of the opener fingers 240. This plate-like comb 254 is inclined downwardly and rearwardly for purposes as will be described hereinafter.

With references to FIGS. 40-45, it will be seen that the upper end portion of each finger 240 is wedge-shaped or pointed and includes a slot 260 which extends inwardly from the tip of each finger. This slot 260 is of a width and depth to accommodate freely the strip or band 12 which was described previously.

Figure 40:
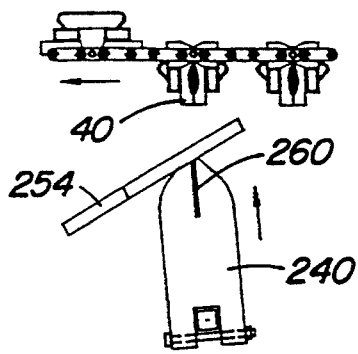
FIGS. 40–45 are a series of end elevation views showing the sequence of motions required in order to effect opening of the successive pairs of conveyor flights and release and discharge of the strips or bands to which the scallops are bonded.
Figure 41:
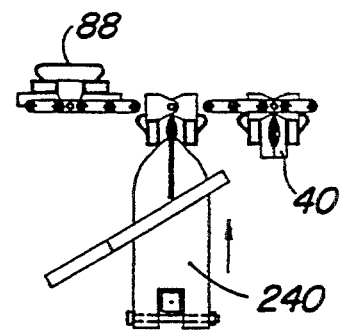
Figure 42:
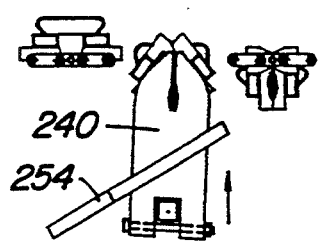

The operation of the opener system will now be described beginning with FIG. 40 wherein the fingers 240 are seen moving upwardly through the respective slots 258 in comb 254. The conveyor at the same time stops, having advanced a closed pair of conveyor flights 40 into a position directly above the tips of the opener fingers. Then, as seen in FIG. 41, the fingers 240 contact the conveyor flights on each side of the foam rubber cups or seats 94 which are holding the shellfish. As then seen in FIG. 42, the conveyor flights 40 are wedged open by virtue of the wedging action of the tips of fingers 240 while at the same time the strip 12 moves into the slots 260 in the tip portions of fingers 240. At the same time the shellfish are pulled out of the foam cups.

Figure 43:
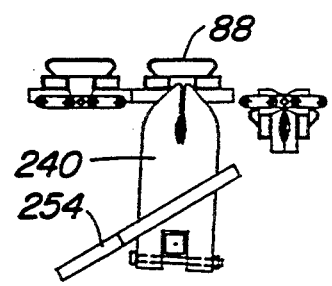
Figure 44:
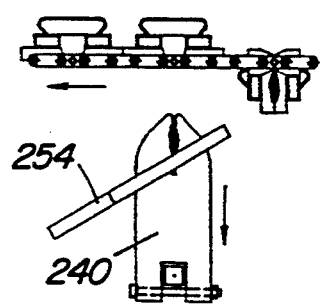
Figure 45:
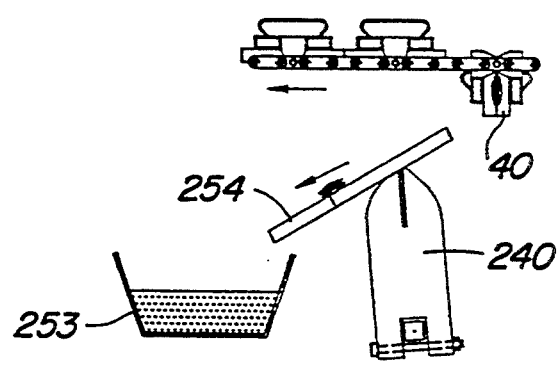

With reference to FIG. 43, the previously described spring 88 pulls the conveyor flights 40 to the full open position and holds them there by virtue of the bi-stable effect described previously. The strip 12 falls downwardly to the bottom end of the slots 260 in the fingers with the shellfish being held between each pair of fingers. Thereafter, as seen in FIG. 44, as the cylinder 250 begins to retract, the fingers 240 move somewhat downwardly through the slots in the comb 254. As the fingers 240 move downwardly, the strip 12 contacts the upper surface of the comb thus holding the strip and the shellfish on the upper inclined surface of the comb as the fingers 240 continue to move downwardly and clear of the comb top surface as illustrated in FIG. 45. With the tips of the fingers 240 retracted below the upper surface of comb 254, the strip with the attached shellfish slides down the comb and into a bath of water contained in flume 253. The moving water in the flume carries the strip with attached shellfish transversely out from under the machine. The conveyor advances two more steps to bring the next following pair of closed conveyor flights 40 into a position above the tips of the fingers 240 following which the sequence of events illustrated in FIGS. 40-45 is repeated.

CONTROL SYSTEM

Figure 46:
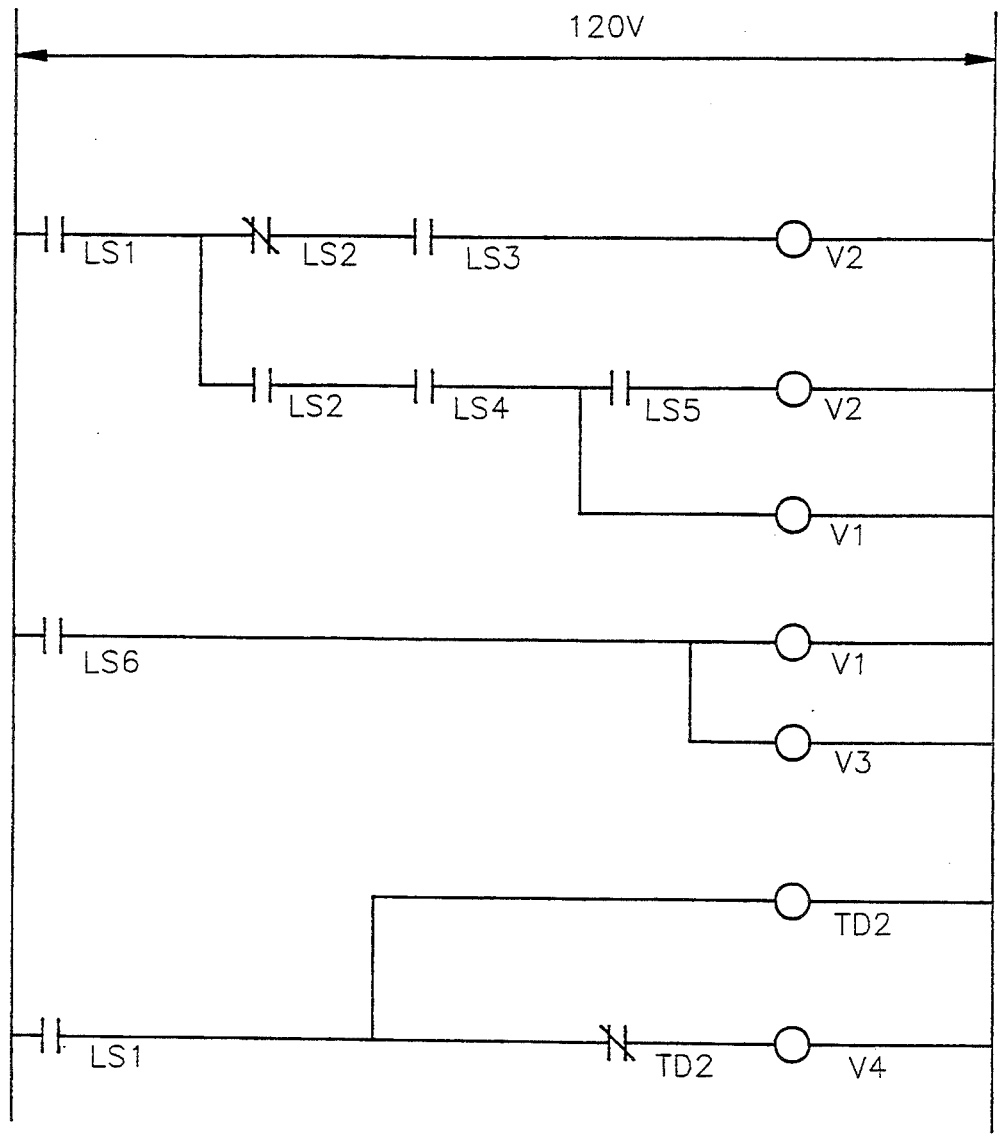
FIG. 46 is a schematic diagram of the control system for ensuring operation of all components of the apparatus in the appropriate sequence.

With reference to FIG. 46, the control system will now be described, including the sequence of operation of the solenoid valves and air cylinders.

The conveyor drive and lift/drop carriage 62 operate by means of a main drive motor 64 a gear reduction unit and two cams 68 and 70 which run continuously. All other operations are sequenced using limit itches (not shown on the drawings) in relation to the operation of the main drive. Limit switch LS1 is closed when the lift/drop carriage is in the down position. Limit switch LS2 is closed when a pair of conveyor flights 40 on the main conveyor are in position to be opened or closed, and LS2 is open on alternate cycles. Limit switch LS3 is closed when the car 202 which pulls the strip 12 across the machine is at the right hand end or home position of the said rodless cylinder 204. Limit switch LS4 is closed when the car which pulls the strip is at the left hand end of the said rodless cylinder. Limit switch LS5 is closed when the closer 180 is up and the conveyor flights 40 are completely closed. Limit switch LS6 makes contact with the lift/drop carriage cam 70 such that it is closed for a short time just before the lift/drop carriage starts to rise. Two valves of the four-way, two position, double solenoid type as manufactured by Schrader Bellows or similar are used to operate all the pneumatic cylinders. These valves are labelled V1 and V2 on the control diagram. The spool in these valves will shuttle in one direction when one solenoid is energized and stay in this position even when the power to the solenoid is removed; the spool will shuttle in the opposite direction when the other solenoid is energized.

The cycle starts when the main conveyor moves ahead one step and the lift/drop carriage 62 drops, closing limit switch LS1. A pair of flights is not in the close/open position at this time so limit switch LS2 is not activated; therefore, the normally closed LS2 contact on the control diagram is "true". The car 202 is in the home position so the limit switch LS3 is closed. The aforementioned conditions make the top rung of the control diagram true which energizes a solenoid on valve V2 which, in turn, provides air to the rodless cylinder 204 to move the car 202 to the left hence pulling the strip 12 across the machine. Energizing valve V2 in this direction also releases the air pressure to the cylinder 220 which allows the knife 216 to retract so the fingers 206 which are holding the strip can pass between the said knife and the anvil. Next the limit switch LS6 contacts the cam 70 and closes momentarily which energizes one of the solenoids on valve V1 but the spool in the valve V1 does not move at this time because it is already in the position indicated by energizing the said solenoid, and the closer and opener cylinders are already in the home position. The momentary closing of the limit switch LS6 also energizes a solenoid valve (labelled valve V3 on the control diagram) which provides air to the blow off nozzles 132 (FIG. 16) on the cleaning station. Limit switch LS6 opens well before the lift/drop carriage starts to rise.

The cycle continues when the lift/drop carriage rises opening limit switch LS1; the main conveyor advances again moving a pair of conveyor flights 40 into position above the closer station and another pair of flights into position above the opener station, at the same time limit switch LS2 closes. The lift/drop carriage drops into position again closing limit switch LS1 which starts the next sequence of operations. Limit switch LS4 is closed because the car on the rodless cylinder is at the far left end and the strip is fully extended across the machine. The aforementioned conditions result in the energizing of the solenoid on valve V1 which can be seen on the control diagram. Valve V1, in turn, provides air to the closer cylinder 190 which closes a pair of conveyor flights onto the strip thus holding the scallops in contact with the strip. Air is also provided by the same valve V 1 to cylinders 250 which open a pair of flights and release a completed strip with scallops attached. When the closer cylinder 190 reaches the end of its stroke, limit switch LS5 closes energizing a solenoid on valve V2 which, in turn, provides air to the rodless cylinder which returns the car 202 to the fight or home position (FIG. 29) and also provides air to cylinder 220 which advances the knife and severs the strip 12. The knife 216 remains clamped against the anvil 218 which holds the severed end of strip 12 in position until the car 204 reaches the home position and the fingers 206 are able to snap close on the end of the strip 12 (FIG. 30). As the car 202 starts to move to the right, the said fingers 206 are mechanically snapped to the open position releasing the end of strip 12 and providing clearance for the fingers to return to the home position without hitting the conveyor (FIG. 24 and FIG. 29). Limit switch LS6 contacts the cam 70 and closes momentarily which again energizes one of the solenoids on valve V1 which this time moves the spool in the valve and, in turn, provides air to closer cylinder 190 and opener cylinders 250 which both return to the home positions. The closing of limit switch LS6 also operates the said blow off valve V3 again which provides air to the blow off nozzles 132 on the cleaning station. The lift/drop carriage rises opening said limit switch LS1 and the cycle repeats as the main conveyor starts to advance.

Time delay relays TD2 on the control diagram are used to individually control the quantity of glue delivered by each glue gun via glue gun air valves V4. Glue starts to flow on each cycle when the lift/drop carriage lowers into position and the said limit switch LS1 closes. The flow of glue to each glue gun stops when the respective time delay relays TD2 time out. The timers are reset on each cycle when limit switch LS1 opens.

The mechanical control system described herein for the preferred design could easily be adapted to a simple but more expensive programmable logic controller. The control system describes the basic routines required to sequence the necessary mechanical operations. Several safety features can be added to stop the main drive motor and release air pressure if a fault is detected.

A preferred embodiment of the invention has been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

We claim:

1. An apparatus for securing groups of objects to opposing sides of elongated strips of material, said apparatus comprising:
   (a) a conveyor having upper and lower runs and being movable step-by-step in an endless path of travel and having spaced pairs of elongated conveyor flights each having a plurality of seats for holding a linear array of the objects and said flights extending transversely to said path of travel;
   (b) said flights of each said pair being pivotable relative to each other about an axis which extends generally transverse to the path of travel, and at least one spring co-acting between the flights of each said pair and arranged in relation to said axis to provide an over-centre bi-stable effect such that said flights are movable between a stable open position for loading of the objects onto said seats and a stable closed position wherein the seats of one said flight are brought into face-to-face correspondence with the seats of the opposing flight;
(c) a conveyor flight closer located at a closure station in the path of movement of the conveyor to effect movement of said flights from the stable open to the stable closed position after each pair of flights arrives at said closure station in the course of said step-by-step movement of the conveyor;
(d) a material strip positioner located at the closure station for positioning a strip of said material between the flights of the respective pairs when in the open position and holding the strip such that the seats of said flights during closure come into said face-to-face relation on opposing faces of said strip to bring objects in said seats into contact with opposing faces of said strip;
(e) an adhesive applicator to apply adhesive in such manner that the applied adhesive can interact between the strip and said objects after said objects have been brought into contact with the strip;
(f) a conveyor flight opener located at a release station to open said flights and release said objects and the strip to which they have become bonded by said adhesive after each pair of flights arrives at said release station in the course of said step-by-step motion of the conveyor and to allow for the loading of a further group of the objects onto the seats of said flights after they have reached the upper run of the conveyor path of travel.

2. The apparatus of claim 1 wherein the flights of each pair are arranged such that in said stable open position said flights are co-planar with each other and located on opposite sides of said axis and when in said closed position the flights are in face-to-face relation and lying to one side of said axis.

3. The apparatus of claim 1 wherein said conveyor flight closer includes arms movable into engagement with the conveyor flights in the open position and acting to force same toward the closed position when said conveyor is momentarily stopped in the course of its step-by-step motion with said at least one spring acting to complete the movement of the conveyor flights into the stable closed position.

4. The apparatus of claim 1 wherein said strip positioner comprises a device for grasping the strip and pulling it lengthwise of the open flights and maintaining the strip under tension until closure of said flights is effected.

5. The apparatus of claim 4 wherein the strip positioner includes a shear for cutting the strip after closure of the flights is effected.

6. The apparatus of claim 5 wherein the device for grasping the strip comprises a pair of fingers capable of grasping the strip between their distal ends, a car on which said fingers are mounted and a track at said closure station above said conveyor so that the car may travel lengthwise of the conveyor flights in the course of pulling the strip of material and a drive for effecting movement of the car along said track in timed relationship to the step-by-step motion of said conveyor.

7. The apparatus of claim 6 wherein the fingers of said pair are pivoted at their proximal ends and are associated with a biasing spring providing an over-centre bi-stable snap action effect providing both stable open and closed positions for said fingers, and members for initiating snap action opening and closure of said fingers adjacent opposing ends of the path of travel of said car along said track means.

8. Apparatus according to claim 2 wherein said objects are juvenile scallops and wherein said seats for holding said objects comprise soft resilient pads each having a concave recess for nesting of a scallop therein.

9. Apparatus according to claim 8 including a washer in advance of said flight closure means for washing a surface of each scallop and a dryer for drying the scallop shells when located on said flights in their open positions and prior to their coming into contact with the adhesive, both the washer and the dryer being located adjacent the upper run of the conveyor.

10. Apparatus according to claim 9 wherein the washer comprises rotary brushes arranged above said conveyor to come into contact with upper surface portions of said scallops, a device for supplying water to said brushes and a resilient retainer for holding said scallops on said resilient pads during washing with said rotary brushes.

11. The apparatus of claim 10 wherein said dryer includes a blower for passing warm air into a plenum chamber above said conveyor, said chamber having apertures therein for releasing streams of air onto scallops supported on said conveyor for drying same.

12. Apparatus according to claim 1 wherein said upper and lower conveyor runs are generally horizontal, said closer, material strip positioner and adhesive applicator being located adjacent to said upper run of the conveyor and said flight opener being adapted to interact with the lower run of said conveyor.

13. Apparatus according to claim 12 wherein said flight opener comprises a plurality of opener fingers and a mechanism for effecting movement thereof toward and away from the lower run of the conveyor, said opener fingers having wedge-shaped tips adapted to enter between the closed flights of each pair upon their arrival at the release station and to wedge the flights of each pair toward the open position, with said flights moving into the stable open position under the influence of said at least one spring which co-acts between the flights of each pair.

14. Apparatus according to claim 13 wherein said tips of the opener fingers are slotted to receive therein the strip of material to which the objects have become bonded upon release of the objects as said flights move to the open stable position.

15. Apparatus according to claim 14 further including a comb having slots therein through which said opener fingers can move with said comb acting to positively remove the strip of material and attached objects from the slotted tips of said opener fingers as the latter move away from the conveyor flights.

16. Apparatus according to claim 1 wherein said adhesive applicator is adapted to apply a small quantity of adhesive in a fluid state to an upper surface of each object prior to their reaching the closure station.

17. Apparatus according to claim 9 wherein said washer and said dryer for the scallop shells are mounted to a vertically movable carriage, and a mechanism for vertically moving said carriage in timed relation to the motion of said conveyor to provide clearance and avoid interference between scallops supported on said conveyor and the washer and dryer as said conveyor effects movement of said scallops.

18. Apparatus as in claim 1 wherein said conveyor includes a drive for moving same in step-by-step fashion, said drive including an advance spring operatively connected to the conveyor and a mechanism for periodically stretching said spring with the stored energy being used to drive said conveyor.

19. In an apparatus for securing objects to elongated strips of material the improvement comprising:
  (a) a conveyor movable in an endless path of travel and having spaced pairs of elongated conveyor flights each having seats for holding a linear array of the objects and said flights extending transversely to said path of travel;
  (b) the flights of each of said pairs being pivotable relative to one another about a pivot axis parallel to said flights from an open position for loading of the objects on said seats to a closed position wherein the seats of one said flight are brought into face-to-face correspondence with the seats of the opposing flight; and
  (c) at least one spring co-acting between the flights of each said pair and arranged in relation to said pivot axis to provide a bi-stable effect providing stable open and closed positions for said flights of each pair.

20. The improvement of claim 19 wherein said axis about which said flights of said pair are pivoted relative to each other is offset from said flights, such that in said open position said flights are generally co-planar with each other and on opposite sides of said axis and when in said closed position the flights are in face-to-face positions lying to one side of said axis.

21. The improvement of claim 20 further including:
  (a) a conveyor flight closer located at a closure station in the path of movement of the conveyor to effect movement of said flights from the open to the closed position after each pair of flights arrives at said closure station in the course of said movement of the conveyor;
  (b) a material strip positioner located at the closure station for positioning a strip of said material between the flights of the respective pairs when in the open position and holding the strip such that the seats of said flights come into said face-to-face relation on opposing surfaces of said strip to bring objects in said seats into contact with said opposing surfaces of said strip;
  (c) an adhesive applicator to apply adhesive in such manner that the applied adhesive can interact between the strip and said objects after said objects have been brought into contact with the strip;
  (d) a conveyor flight opener located at a release station to open said flights and release said objects and the strip to which they have become bonded by said adhesive after each pair of flights arrives at said release station in the course of said motion of the conveyor.

22. The improvement according to claim 21 wherein said conveyor includes upper and lower runs, said flight opener being adapted to interact with the lower run of said conveyor, and a conveyor drive adapted to move the conveyor in step-by-step fashion in its endless path of travel.

23. The improvement according to claim 22 wherein said conveyor flight opener comprises a plurality of opener fingers and a mechanism for effecting movement thereof toward and away from the lower run of the conveyor, said opener fingers having wedge-shaped tips adapted to enter between the closed flights of each pair upon the arrival at the release station and in timed relation to the step-by-step conveyor motion and to wedge the flights of each pair toward the stable open position with said flights moving into the stable open position under the influence of said at least one spring which co-acts between the flights of each pair.

24. The improvement according to claim 23 wherein said tips of the opener fingers are slotted to receive therein the strip of material to which the objects have become bonded upon release of the latter as said flights move to the open position to prevent the strip with attached objects from falling freely from the conveyor.

25. The improvement according to claim 24 further including a slotted comb through which said opener fingers can move with said comb acting to positively remove the strip of material and attached objects from the slotted tips of said opener fingers as the latter move away from the conveyor flights.

26. An apparatus for securing groups of objects to elongated strips of material including:
  (a) an endless conveyor having upper and lower runs movable step-by-step in an endless path of travel and having spaced pairs of elongated conveyor flights each having plural seats for holding a linear array of the objects and said flights extending transversely to said path of travel;
  (b) the flights of each of said pairs being pivotable relative to one another from a stable open position for loading of a group of objects onto said seats to a stable closed position wherein the seats of one said flight are brought into face-to-face correspondence with the seats of the opposing flight;
  (c) conveyor flight closer located at a closure station in the path of movement of the conveyor to effect movement of said flights from the open to the closed position after each pair of flights arrives at said closure station in the course of said step-by-step movement of the conveyor;
  (d) a material strip positioner located at the closure station for positioning a strip of said material between the flights of the respective pairs when in the open position and holding the strip such that the seats of said flights during closure come into said face-to-face relation on opposing surfaces of said strip to bring objects in said seats into contact with opposing surfaces of said strip;
  (e) an adhesive applicator to apply adhesive in such manner that the applied adhesive can interact between the strip and said objects after said objects have been brought into contact with the strip;
  (f) a conveyor flight opener located at a release station adjacent the lower run of the conveyor to open said flights and release said objects and the strip to which they have become bonded by said adhesive after each pair of flights arrives at said release station in the course of said step-by-step motion of the conveyor;
  (g) said flight opener including a plurality of opener fingers and a mechanism for effecting movement thereof toward and away from the lower run of the conveyor, said opener fingers having wedge-shaped tips adapted to enter between the closed flights of each pair upon their arrival at the release station and to wedge the flights of each pair toward and into the stable open position, to allow for loading of a further group of the objects onto the seats of said flights after they have reached the upper run of the conveyor path of travel.

27. Apparatus according to claim 26 wherein said tips of the opener fingers are slotted to receive therein the strip of material to which the objects have become bonded upon release of the latter as said flights move to the open position.

28. Apparatus according to claim 27 further including a slotted comb through which said opener fingers can move with said comb acting to positively remove the strip of material and attached objects from the slotted tips of said opener fingers as the latter move away from the conveyor flights.

29. The apparatus of claim 26 wherein said flights of said pair are pivoted relative to each other about an offset axis, and a spring co-acting between the flights of said pair and arranged in relation to said axis to provide an over-centre bi-stable effect providing said stable open and closed positions for said flights of each pair.

30. The apparatus of claim 29 wherein said conveyor flight closer includes arms movable into engagement with the conveyor flights in the stable open position and acting to force same toward the closed position with said spring acting to complete the movement of the conveyor flights into the stable closed position.

31. The apparatus of claim 30 wherein said strip positioner comprises a device for grasping the strip and pulling it lengthwise of the open flights and maintaining the strip under tension until closure of said flights is effected.

32. The apparatus of claim 31 wherein the strip positioning means includes a shear for cutting the strip after closure of the flights is effected.

33. The apparatus of claim 32 wherein the device for grasping the strip comprises a pair of fingers capable of grasping the strip between their distal ends, a car on which said fingers are mounted and a track at said closure station above said conveyor so that the car may travel lengthwise of the conveyor flights in the course of pulling the strip of material and a device for effecting movement of the car along said track in timed relationship to the step-by-step motion of said conveyor.

34. The apparatus of claim 33 wherein the fingers of said pair are pivoted at their proximal ends and are associated with a biasing device providing an over-centre bi-stable snap action effect providing both stable open and closed positions for said fingers, and a mechanism for initiating snap action opening and closure of said fingers adjacent opposing ends of the path of travel of said car along said track.

* * * * *